US012812660B2

(12) United States Patent
Yuan et al.

(10) Patent No.: US 12,812,660 B2
(45) Date of Patent: Nov. 24, 2026

(54) DETERMINING DEFAULT UNIFIED TRANSMISSION CONFIGURATION INDICATOR STATES

(71) Applicant: QUALCOMM INCORPORATED, San Diego, CA (US)

(72) Inventors: Fang Yuan, Beijing (CN); Yan Zhou, San Diego, CA (US); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 18/717,964

(22) PCT Filed: Mar. 2, 2022

(86) PCT No.: PCT/CN2022/078807

§ 371 (c)(1),
(2) Date: Jun. 7, 2024

(87) PCT Pub. No.: WO2023/164830

PCT Pub. Date: Sep. 7, 2023

(65) Prior Publication Data

US 2024/0414735 A1 Dec. 12, 2024

(51) Int. Cl.
*H04W 72/232* (2023.01)
*H04B 7/06* (2006.01)
*H04W 72/1273* (2023.01)

(52) U.S. Cl.
CPC ........ *H04W 72/232* (2023.01); *H04B 7/0695* (2013.01); *H04W 72/1273* (2013.01)

(58) Field of Classification Search
CPC ............ H04W 72/232; H04W 72/1273; H04B 7/0695
See application file for complete search history.

(56) References Cited

U.S. PATENT DOCUMENTS 11,013,003 B2 5/2021 Sun et al.
2020/0267748 A1 8/2020 Khoshnevisan et al.
2021/0136802 A1* 5/2021 Cirik .................... H04B 7/0695

FOREIGN PATENT DOCUMENTS

CN 111148239 A 5/2020
CN 112514314 A 3/2021
(Continued)

OTHER PUBLICATIONS

International Search Report and Written Opinion—PCT/CN2022/078807—ISA/EPO—Nov. 30, 2022.
(Continued)

*Primary Examiner* — Erika A Washington
(74) *Attorney, Agent, or Firm* — Holland & Hart LLP

(57) ABSTRACT

Methods, systems, and devices for wireless communications are disclosed. A user equipment (UE) may receive control signaling scheduling downlink messages and indicating one or more transmission configuration indicator (TCI) states for reception of the one or more downlink messages during multiple transmission and reception point (mTRP) operation. The UE may identify that the downlink messages are scheduled for reception prior to an end of an offset window associated with processing the one or more TCI states. The UE may select one or more default unified TCI states to receive the downlink messages based on one or more conditions or parameters. The UE may receive the one or more downlink messages via the selected one or more default unified TCI states based on an arrival of the one or more downlink messages occurring prior to the end of the offset window.

28 Claims, 12 Drawing Sheets

(56) References Cited

FOREIGN PATENT DOCUMENTS

| | | | | | |
|---|---|---|---|---|---|
| CN | 113412592 | A | | 9/2021 | |
| CN | 114126057 | A | | 3/2022 | |
| WO | WO-2020028488 | | | 2/2020 | |
| WO | WO-2020168116 | A1 | | 8/2020 | |
| WO | WO-2021203414 | A1 | | 10/2021 | |
| WO | WO-2021205421 | A1 | * | 10/2021 | ........ H04W 72/1273 |

OTHER PUBLICATIONS

Vivo: "Maintenance on Default QCL Issues and Multi TRP", 3GPP TSG RAN WG1 #104-e, R1-100418, e-Meeting, Jan. 25-Feb. 5, 2021, 7 Pages.

Supplementary European Search Report—EP22929281—Search Authority—The Hague—Oct. 20, 2025.

Vivo: "Further Discussion on Multi Beam Enhancement", 3GPP Draft; R1-2007644, 3rd Generation Partnership Project, Mobile Competence Centre, 650, Route Des Lucioles, F-06921, Sophia-Antipolis Cedex, France, vol. RAN WG1, No. e-Meeting; Oct. 26, 2020-Nov. 13, 2020, Nov. 1, 2020, 26 Pages, XP052348998, Section 2.5.

* cited by examiner

DETERMINING DEFAULT UNIFIED TRANSMISSION CONFIGURATION INDICATOR STATES

CROSS REFERENCE

The present application is a 371 national stage filing of International PCT Application No. PCT/CN2022/078807 by Yuan et al. entitled "DETERMINING DEFAULT UNIFIED TRANSMISSION CONFIGURATION INDICATOR STATES," filed Mar. 2, 2022, which is assigned to the assignee hereof, and which is expressly incorporated by reference in its entirety herein.

FIELD OF TECHNOLOGY

The following relates to wireless communications, including determining default unified transmission configuration indicator (TCI) states.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communication systems, a UE may be in communication with one or more network entities in accordance with multiple transmission and reception point (mTRP) operation. In some cases, the UE may communicate with the one or more network entities based on a transmission configuration indicator (TCI) associated with each network entity. Techniques for configuring the UE with TCI states for mTRP operations may be improved.

SUMMARY

The described techniques relate to improved methods, systems, devices, and apparatuses that support determining default unified transmission configuration indicator (TCI) states. Generally, the described techniques provide procedures for determining default TCI states in a wireless communications system. The techniques enable a user equipment (UE) to determine one or more default TCI states to use in receiving downlink transmissions from one or more network entities. For example, the UE may receive control signaling indicating a selected unified TCI codepoint. Sometime later, the UE may receive a scheduling message indicative of one or more scheduled downlink transmissions and in some cases, indicative of a TCI state associated with the one or more downlink transmissions. In some cases, one or more network entities may transmit the downlink transmissions to the UE during a scheduling offset window, where the scheduling offset window may define a duration to allow the UE time to switch to an indicated TCI state associated with the downlink transmissions. Because the UE may receive the one or more downlink messages during the scheduling offset window, the UE may not have the time to switch to the TCI state before receiving the downlink transmissions.

Accordingly, the UE may select one or more default unified TCI states based on the selected unified TCI codepoint to receive the one or more downlink transmissions. The selected unified TCI codepoint may map to one or more joint downlink and uplink unified TCI states, one or more downlink only unified TCI states, one or more uplink only unified TCI states, or a combination thereof. In some cases, the UE may select the one or more default unified TCI states based on whether the UE receives the selected unified TCI codepoint, the scheduling information, or both, in a single downlink control information (DCI) (sDCI) or a multiple DCI (mDCI) message, whether the UE is configured to enable multiple default unified TCI states, whether the UE is configured to enable a default unified TCI state per network entity, the unified TCI states included in the configured unified TCI codepoint, or any combination thereof.

A method for wireless communications at a UE is described. The method may include receiving a downlink control information message scheduling one or more downlink messages for reception during mTRP operation of a network entity, the DCI message including an indication of one or more TCI states for reception of the one or more downlink messages, identifying that the one or more downlink messages are scheduled for reception prior to an end of an offset window associated with processing the indication of the one or more TCI states, where a start of the offset window is based at least part on the DCI message, selecting one or more default unified TCI states based on the DCI message and the mTRP operation, and receiving the one or more downlink messages while operating in the one or more default unified TCI states based on an arrival of the one or more downlink messages occurring prior to the end of the offset window.

An apparatus for wireless communications at a UE is described. The apparatus may include a processor, memory coupled with the processor, and instructions stored in the memory. The instructions may be executable by the processor to cause the apparatus to receive a DCI message scheduling one or more downlink messages for reception during mTRP operation of a network entity, the DCI message including an indication of one or more TCI states for reception of the one or more downlink messages, identify that the one or more downlink messages are scheduled for reception prior to an end of an offset window associated with processing the indication of the one or more TCI states, where a start of the offset window is based at least part on the DCI message, select one or more default unified TCI states based on the DCI message and the mTRP operation, and receive the one or more downlink messages while operating in the one or more default unified TCI states based on an arrival of the one or more downlink messages occurring prior to the end of the offset window.

Another apparatus for wireless communications at a UE is described. The apparatus may include means for receiving a DCI message scheduling one or more downlink messages for reception during mTRP operation of a network entity, the DCI message including an indication of one or more TCI states for reception of the one or more downlink messages, means for identifying that the one or more downlink messages are scheduled for reception prior to an end of an offset window associated with processing the indication of the one or more TCI states, where a start of the offset window is based at least part on the DCI message, means for selecting one or more default unified TCI states based on the DCI message and the mTRP operation, and means for receiving the one or more downlink messages while operating in the one or more default unified TCI states based on an arrival of the one or more downlink messages occurring prior to the end of the offset window.

A non-transitory computer-readable medium storing code for wireless communications at a UE is described. The code may include instructions executable by a processor to receive a DCI message scheduling one or more downlink messages for reception during mTRP operation of a network entity, the DCI message including an indication of one or more TCI states for reception of the one or more downlink messages, identify that the one or more downlink messages are scheduled for reception prior to an end of an offset window associated with processing the indication of the one or more TCI states, where a start of the offset window is based at least part on the DCI message, select one or more default unified TCI states based on the DCI message and the mTRP operation, and receive the one or more downlink messages while operating in the one or more default unified TCI states based on an arrival of the one or more downlink messages occurring prior to the end of the offset window.

Some examples of the method, apparatuses, and non-transitory computer-readable medium described herein may further include operations, features, means, or instructions for receiving, prior to the DCI message, a message indicative of a selected unified TCI codepoint for use by the UE in communications with the network entity.

In some examples of the method, apparatuses, and non-transitory computer-readable medium described herein, selecting the one or more default unified TCI states may include operations, features, means, or instructions for selecting two default unified TCI states from the selected unified TCI codepoint.

Some examples of the method, apparatuses, and non-transitory computer-readable medium described herein may further include operations, features, means, or instructions for selecting from the selected unified TCI codepoint may be based on the selected unified TCI codepoint including at least two downlink applicable TCI states.

Some examples of the method, apparatuses, and non-transitory computer-readable medium described herein may further include operations, features, means, or instructions for selecting the two default unified TCI states may be based on the UE being enabled for two default TCI states.

Some examples of the method, apparatuses, and non-transitory computer-readable medium described herein may further include operations, features, means, or instructions for selecting the two default unified TCI states may be based on the DCI message being a single DCI message.

In some examples of the method, apparatuses, and non-transitory computer-readable medium described herein, selecting the one or more default unified TCI states may include operations, features, means, or instructions for selecting one default unified TCI state from the selected unified TCI codepoint.

Some examples of the method, apparatuses, and non-transitory computer-readable medium described herein may further include operations, features, means, or instructions for selecting the one default unified TCI state may be based on the selected unified TCI codepoint including one downlink applicable TCI state.

In some examples of the method, apparatuses, and non-transitory computer-readable medium described herein, the UE selects the one default unified TCI state irrespective of whether the UE being enabled for two default TCI states.

Some examples of the method, apparatuses, and non-transitory computer-readable medium described herein may further include operations, features, means, or instructions for selecting the one default unified TCI state may be based on the UE being enabled for one default TCI states.

In some examples of the method, apparatuses, and non-transitory computer-readable medium described herein, the UE selects the one default unified TCI state irrespective of whether the selected unified TCI codepoint includes at least two downlink applicable TCI state.

In some examples of the method, apparatuses, and non-transitory computer-readable medium described herein, the UE selects the one default unified TCI state based on the one being a first downlink applicable TCI state of the selected unified TCI codepoint.

In some examples of the method, apparatuses, and non-transitory computer-readable medium described herein, the UE selects the one default unified TCI state based on the DCI message being a single DCI message or a multiple DCI message.

In some examples of the method, apparatuses, and non-transitory computer-readable medium described herein, the UE selects the one default unified TCI state based on at least one control resource set being associated with a control resource set pool index.

In some examples of the method, apparatuses, and non-transitory computer-readable medium described herein, the UE selects the one default unified TCI state based on the UE being enabled for a default TCI state per control resource set pool index.

In some examples of the method, apparatuses, and non-transitory computer-readable medium described herein, the DCI message may be associated with the control resource set pool index.

In some examples of the method, apparatuses, and non-transitory computer-readable medium described herein, selecting the one or more default unified TCI states may include operations, features, means, or instructions for selecting the one or more default unified TCI states from a unified TCI codepoint other than the selected unified TCI codepoint in accordance with a default rule.

Some examples of the method, apparatuses, and non-transitory computer-readable medium described herein may further include operations, features, means, or instructions for selecting in accordance with the default rule may be based on the UE being enabled for two default TCI states and the selected unified TCI codepoint including one downlink applicable TCI state.

In some examples of the method, apparatuses, and non-transitory computer-readable medium described herein, selecting the one or more default unified TCI states may include operations, features, means, or instructions for selecting two default unified TCI states from the unified TCI codepoint based on the unified TCI codepoint being a lowest codepoint in a set of activated codepoints that includes at least two downlink applicable TCI states.

In some examples of the method, apparatuses, and non-transitory computer-readable medium described herein, selecting the one or more default unified TCI states may include operations, features, means, or instructions for selecting a downlink applicable TCI state for a lowest control resource set identifier in a latest monitored slot as the one or more default unified TCI states in accordance with a default rule.

Some examples of the method, apparatuses, and non-transitory computer-readable medium described herein may further include operations, features, means, or instructions for selecting in accordance with the default rule may be based on the DCI message being a multiple DCI message, and based on at least one control resource set being associated with a control resource set pool index.

Some examples of the method, apparatuses, and non-transitory computer-readable medium described herein may further include operations, features, means, or instructions for selecting in accordance with the default rule may be based on the UE not being enabled for a default TCI state per control resource set pool index.

Some examples of the method, apparatuses, and non-transitory computer-readable medium described herein may further include operations, features, means, or instructions for receiving, prior to the message, a signal indicating a set of one or more activated TCI codepoints.

In some examples of the method, apparatuses, and non-transitory computer-readable medium described herein, each TCI codepoint of the set of one or more activated TCI codepoints includes one or more joint TCI states, one or more downlink TCI states, one or more uplink TCI states, a joint TCI state and a downlink TCI state being downlink applicable TCI states.

In some examples of the method, apparatuses, and non-transitory computer-readable medium described herein, the set of one or more activated TCI codepoints includes the selected unified TCI codepoint.

In some examples of the method, apparatuses, and non-transitory computer-readable medium described herein, the signal may be included in a medium access control (MAC) control element (MAC-CE) message.

In some examples of the method, apparatuses, and non-transitory computer-readable medium described herein, the selected unified TCI codepoint may be associated with dedicated downlink control channel messages, dedicated downlink shared channel messages, or both.

In some examples of the method, apparatuses, and non-transitory computer-readable medium described herein, the message may be a second DCI message received prior to the DCI message.

In some examples of the method, apparatuses, and non-transitory computer-readable medium described herein, the one or more downlink messages include an aperiodic channel state information (AP-CSI) reference signal, a downlink shared channel message, or both.

DETAILED DESCRIPTION

Figure 1:
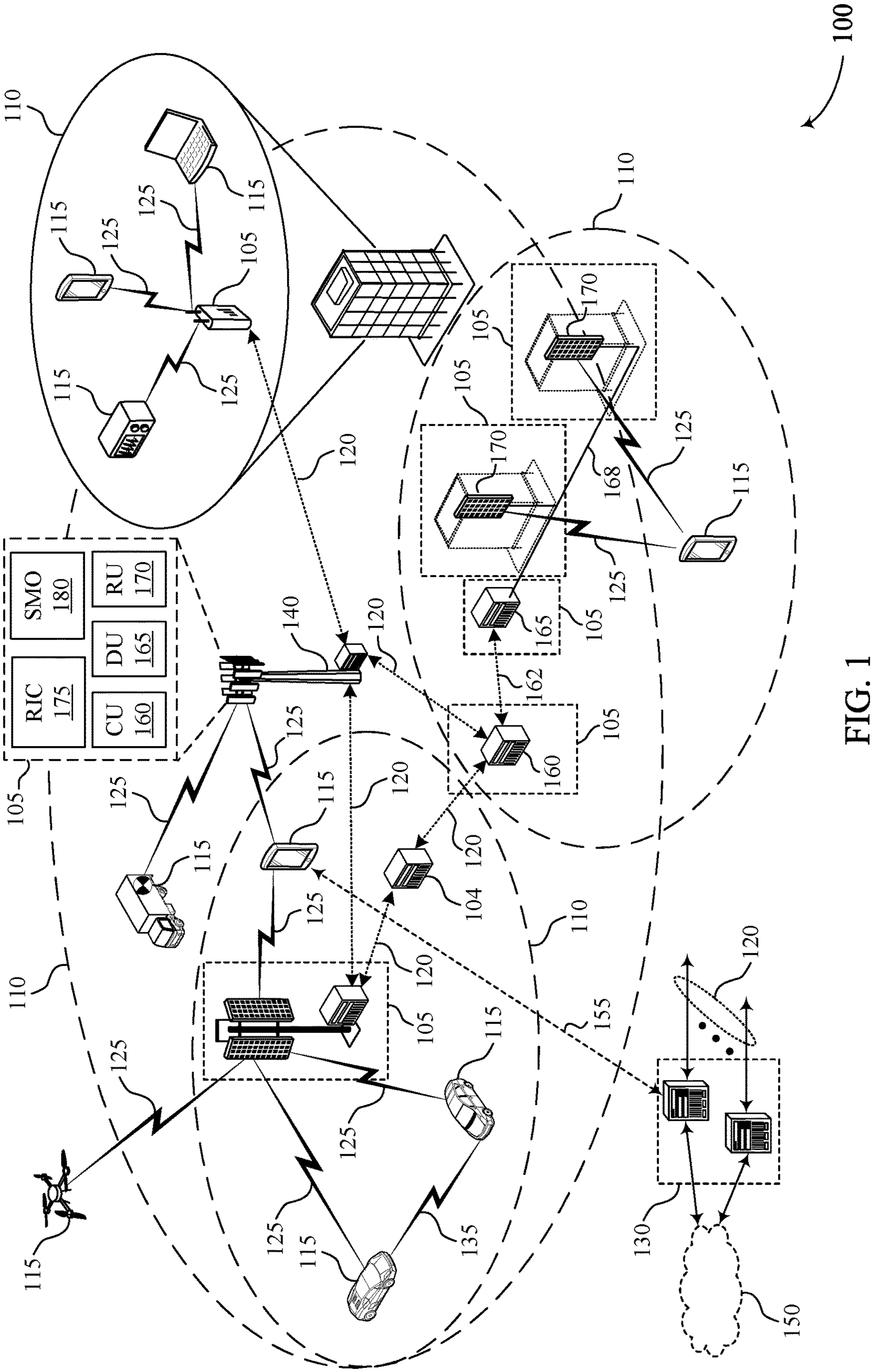
FIGS. 1 and 2 illustrate examples of wireless communications systems that support determining default unified transmission configuration indicator (TCI) states in accordance with one or more aspects of the present disclosure.

In some wireless communications systems, a user equipment (UE) may communicate with multiple network entities (e.g., multiple transmission/reception points (TRPs)) in a multi-TRP (mTRP) mode. For instance, the UE may perform simultaneous communications with a first network entity and a second network entity. In some examples, communicating with the network entities may include the UE receiving control signaling (e.g., one or more downlink control information (DCI) messages) that indicates scheduling information and a transmission configuration indicator (TCI) state. For example, one or more network entities may schedule downlink transmissions (e.g., through the one or more DCIs), such as an aperiodic channel state information (AP-CSI) message, a physical downlink shared channel (PDSCH) message, etc., in which the UE may receive the downlink transmissions according to an indicated TCI state included in the control signaling. Receiving the one or more DCI messages may prompt the start of a scheduling offset window that is associated with an amount of time for the UE to decode the one or more DCIs, identify the TCI state for the scheduled downlink transmission, and to switch to the TCI state to receive the downlink transmissions. In some cases, the UE may receive the scheduled downlink transmission within the scheduling offset window and therefore may not have time to decode, identify, and/or switch to the TCI state before receiving the scheduled downlink transmissions. In such cases, the UE may be configured to receive the downlink transmission with a default TCI state in accordance with a default rule.

In some examples, a wireless communications system may support a unified TCI framework, such as for mTRP operation. For example, the UE may receive an activation message (e.g., in a medium access control (MAC) control element (MAC-CE), or some other control message) that activates a set of unified TCI codepoints. Each unified TCI codepoint may include one or more unified TCI state identifiers, and each respective TCI state identifier in a unified TCI codepoint may correspond to a TCI state type, such as uplink (e.g., uplink only), downlink (e.g., downlink only), or both (e.g., joint uplink and downlink). For example, one TCI state or multiple TCI states may be mapped to a single TCI codepoint, where each TCI state in the single TCI codepoint may be associated with a TCI state type. The UE may receive a DCI that indicates a first unified TCI codepoint of the set of activated unified TCI codepoints for mTRP communications between multiple network entities and the UE. The first unified TCI codepoint may be mapped to one or more unified TCI states and may be applicable for future transmissions associated with the multiple network entities, such as until the UE receives another DCI indicating a second unified TCI codepoint.

In some cases, the UE 115 may receive a scheduling message separate from the TCI selection control message, where the scheduling message may indicate scheduling information for communications associated with the UE. Therefore, the UE may receive the DCI indicating (e.g., selecting) a unified TCI codepoint, and receive one or more second DCIs including scheduling information (e.g., scheduling of the AP-CSI and/or PDSCH), additional and/or updated TCI information, or a combination thereof. The one or more second DCIs may prompt the start of the scheduling offset window. In some cases, however, one or more of the multiple network entities may transmit the scheduled downlink transmissions within the scheduling offset window. To receive the scheduled downlink transmissions, and in the case that the UE is configured with a selected unified TCI codepoint, the UE may determine whether to use one or more unified TCI states of the selected unified TCI codepoint as default unified TCI states.

The techniques described herein provide procedures for determining a default unified TCI state configuration for mTRP operation. For example, a UE may determine that downlink messages are scheduled for reception prior to an end of an offset window. To receive the downlink messages, the UE may determine whether to select one or more default unified TCI states associated with a previously selected unified TCI codepoint. In some cases, the UE may select the one or more default unified TCI states based on one or more conditions or parameters. The one or more conditions or parameters may include whether the UE receives the unified TCI codepoint, the scheduling information, or both, in a single DCI (sDCI) or multiple DCI (mDCI) messages: whether the UE is configured to enable multiple default unified TCI states; whether the UE is configured to enable a default unified TCI state per network entity; types of unified TCI states included in the selected unified TCI codepoint: or any combination thereof.

Particular aspects of the subject matter described herein may be implemented to realize one or more advantages. The described techniques allow for a UE to configure a default unified TCI state based on a selected unified TCI codepoint, which may improve reliability and reduce latency in mTRP communications, among other advantages. As such, supported techniques may include improved network operations and, in some examples, may promote network efficiencies, among other benefits.

Aspects of the disclosure are initially described in the context of wireless communications systems. Aspects of the disclosure are then described with respect to process flows. Aspects of the disclosure are further illustrated by and described with reference to apparatus diagrams, system diagrams, and flowcharts that relate to determining default unified TCI states.

FIG. 1 illustrates an example of a wireless communications system 100 that supports determining default unified TCI states in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a TRP. One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support determining default unified TCI states as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below: 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

A quasi co-location (QCL) relationship between one or more transmissions or signals may refer to a relationship between the antenna ports (and the corresponding signaling beams) of the respective transmissions. For example, one or more antenna ports may be implemented by a network entity 105 for transmitting at least one or more reference signals (such as a downlink reference signal, a synchronization signal block (SSB), or the like) and control information transmissions to a UE 115. However, the channel properties of signals sent via the different antenna ports may be interpreted (e.g., by a receiving device) to be the same (e.g., despite the signals being transmitted from different antenna ports), and the antenna ports (and the respective beams) may be described as being quasi co-located (QCLed). QCLed signals may enable the UE 115 to derive the properties of a first signal (e.g., delay spread, Doppler spread, frequency shift, average power) transmitted via a first antenna port from measurements made on a second signal transmitted via a second antenna port. Put another way, if two antenna ports are categorized as being QCLed in terms of, for example, delay spread then the UE 115 may determine the delay spread for one antenna port (e.g., based on a received reference signal, such as CSI-RS) and then apply the result to both antenna ports. Such techniques may avoid the UE 115 determining the delay spread separately for each antenna port. In some cases, two antenna ports may be said to be spatially QCLed, and the properties of a signal sent over a directional beam may be derived from the properties of a different signal over another, different directional beam. That is, QCL relationships may relate to beam information for respective directional beams used for communications of various signals.

Different types of QCL relationships may describe the relationship between two different signals or antenna ports. For instance, QCL-TypeA may refer to a QCL relationship between signals including Doppler shift, Doppler spread, average delay, and delay spread. QCL-TypeB may refer to a QCL relationship including Doppler shift and Doppler spread, whereas QCL-TypeC may refer to a QCL relationship including Doppler shift and average delay. A QCL-TypeD may refer to a QCL relationship of spatial parameters, which may indicate a relationship between two or more directional beams used to communicate signals. Here, the spatial parameters may indicate that a first beam used to transmit a first signal may be similar (or the same) as another beam used to transmit a second, different, signal, or, that the same receive beam may be used to receive both the first and the second signal. Thus, the beam information for various beams may be derived through receiving signals from a transmitting device, where, in some cases, the QCL information or spatial information may help a receiving device efficiently identify communications beams (e.g., without having to sweep through a large number of beams to identify the best beam (e.g., the beam having a highest signal quality)). In addition, QCL relationships may exist for both uplink and downlink transmissions and, in some cases, a QCL relationship may also be referred to as spatial relationship information.

In some examples, a TCI state may include one or more parameters associated with a QCL relationship between transmitted signals. For example, a network entity 105 may configure a QCL relationship that provides a mapping between a reference signal and antenna ports of another signal (e.g., a DMRS antenna port for PDCCH, a DMRS antenna port for PDSCH, a CSI-RS antenna port for CSI-RS, or the like), and the TCI state may be indicated to the UE 115 by the network entity 105 indicative of a QCL relationship. In some cases, a set of TCI states may be indicated to a UE 115 via control signaling (e.g., RRC signaling), where some number of TCI states may be configured via RRC and a subset of TCI states may be activated via a MAC-CE. The QCL relationship associated with the TCI state (and further established through higher-layer parameters) may provide the UE 115 with the QCL relationship for respective antenna ports and reference signals transmitted by the network entity 105.

In some cases, the UE 115 may support mTRP operation, where the UE 115 may communicate with multiple network entities 105. For instance, the UE 115 may perform simultaneous communications with a first network entity 105 and a second network entity 105. In some examples, communicating with the network entities 105 may include the UE 115 receiving control signaling (e.g., DCI) that indicates scheduling information and a TCI state associated with the scheduling information. In some cases, the UE 115 may receive the control signaling from each of the network entities 105 (e.g., via an mDCI), which may individually schedule communications with each respective network entity 105. In some cases, the UE 115 may receive the control signaling from a single network entity 105 (e.g., via an sDCI) that may configure the UE 115 for scheduled communications with the multiple network entities 105. In some cases, the network entities 105 may transmit one or more DCIs (e.g., DCI repetition).

In some examples, the simultaneous communications may be performed based on separate beams (e.g., separate TCI states) according to one or more communication schemes. For example, the network entities 105 may transmit, to the UE 115, according to the one or more communication schemes associated with a PDSCH and/or a physical downlink control channel (PDCCH). A first communication scheme may be a spatial division multiplexing (SDM) scheme in which each network entity 105 transmits on a separate set of spatial layers. A second communication scheme may be a frequency division multiplexing (FDM) scheme in which each network entity 105 transmits on separate frequency domain resources. A third communication scheme may be a time division multiplexing (TDM) scheme in which each network entity 105 transmits on separate time domain resources. A fourth communication scheme may be a single frequency network (SFN) scheme in which each network entity 105 transmits on separate beams in a synchronized manner using the same time and frequency resources. In some cases, one or more of the communication schemes may include a physical uplink control channel (PUCCH) or a physical uplink shared channel (PUSCH) repetition. For example, the repetitions may be configured in accordance with TDM cyclic mapping. TDM sequential mapping, etc.

In some examples of the wireless communications system 100, one or more wireless devices may support a unified TCI framework. The unified TCI framework may indicate multiple downlink and uplink TCI states, such as in an mTRP use case. In some cases, the techniques described herein may be used to facilitate simultaneous multi-panel uplink transmission for higher uplink throughput and/or reliability, assuming one or more network entities 105 (e.g., TRPs) and/or one or more panels are configured for communications. The techniques may target customer premises equipment (CPE), fixed wireless access (FWA), vehicles, industrial devices, etc. For example, when no new codebook is introduced for multi-panel simultaneous transmission during an uplink precoding indication for physical uplink shared channel (PUSCH), a total number of layers may be up to a first number (e.g., four) across all panels and a total number of codewords may be up to a second number (e.g., two) across all panels. In some cases, the first number and the second number may be based on an sDCI operation, an mDCI operation, or both. In some examples, when assuming a unified TCI framework extension and considering sDCI and mDCI based mTRP operation for an uplink beam indication for physical uplink control channel (PUCCH) and/or PUSCH, then a combination of the channels (e.g., PUSCH+PUSCH or PUCCH+PUCCH) may be transmitted across multiple (e.g., two) panels in a same component carrier (CC) (e.g., for mDCI based mTRP operation). In some cases, one or more timing advances may be used for uplink mDCI based mTRP operation. In some examples, a unified TCI framework extension may be assumed for power control for uplink sDCI based mTRP operation.

In some cases, different types of TCIs (e.g., unified TCI types) may be used to improve channel utilization between wireless devices (e.g., UEs 115, network entities 105). For example, a wireless communications system 100 may support a separate downlink TCI type (e.g., common or single), a separate uplink TCI type (e.g., common or single), or a joint downlink and uplink TCI type. For example, a first TCI type may be a joint TCI type that indicates a common beam for both downlink and uplink channels and/or RSs, a second TCI type may be a separate downlink common TCI type that indicates a common beam for one or more downlink channels and/or RSs, a third TCI type may be a separate uplink common TCI type that indicates a common beam for one or more uplink channels and/or RSs, a fourth TCI type may be a separate downlink single TCI type that indicates a beam for a single downlink channel and/or RS, a fifth TCI type may be a separate uplink single TCI type that indicates a beam for a single uplink channel and/or RS, and a sixth TCI type may include spatial relation information (SRI) that indicates a beam for a single uplink channel and/or RS. In some examples, these various TCI types may be respective examples of one or more unified TCI types (e.g., TCI types associated with a unified TCI framework).

In some examples, the UE 115 may receive an activation message (e.g., in a MAC-CE, or some other control message) that activates a set of unified TCI codepoints. Each unified TCI codepoint may include one or more unified TCI states, and each respective TCI state identifier in the unified TCI codepoint may correspond to a TCI state type, such as an uplink type, a downlink type, or both. For example, one TCI state or multiple TCI states may be mapped to a single TCI codepoint, where each activated TCI state is associated with a TCI state type. Upon being configured with the activated TCI codepoints, the UE 115 may receive a DCI that indicates a first unified TCI codepoint of the set of activated unified TCI codepoints for mTRP communications between multiple network entities 105 and the UE 115. The first unified TCI codepoint may be mapped to one or more unified TCI states and may be applicable for future transmissions associated with the multiple network entities 105, such as until the UE 115 receives another DCI indicating a second unified TCI codepoint.

In some cases, the UE 115 may receive a scheduling message separate from the TCI selection control message, where the scheduling message may indicate scheduling information for communications associated with the UE 115. Therefore, the UE 115 may receive a first DCI indicating (e.g., selecting) a unified TCI codepoint, and then receive one or more second DCIs including scheduling information (e.g., scheduling of the AP-CSI and/or PDSCH), additional and/or updated TCI information, or both. The unified TCI codepoint indicated may have one or more TCI states. The one or more second DCIs may prompt the start of the scheduling offset window that is associated with an amount of time for the UE 115 to decode the DCI, identify TCI information for the scheduled downlink transmission, and to switch to an appropriate TCI state to receive the downlink transmissions. The one or more second DCIs may indicate the scheduling information for schedulings (e.g., the scheduled AP-CSI and/or PDSCH messages) to apply a different number of TCI states in the indicated unified TCI codepoint in the first DCI. In some cases, however, one or more of the multiple network entities 105 may transmit the scheduled downlink transmissions within the scheduling offset window from the one or more second DCIs, such that the UE 115 may not have enough time to decode the one or more second DCIs for obtaining the scheduling information (i.e., the indicated number of TCIs to be applied for the schedulings), or may not have enough time to switch a beam used for communicating the schedulings based on the scheduling information To receive the scheduled downlink transmissions, the UE 115 may use a default unified TCI state.

The techniques described herein provide procedures for determining a default unified TCI state configuration for mTRP operation. For example, a UE 115 may determine that downlink messages are scheduled for reception prior to an end of an offset window associated with processing one or more unified TCI states. To receive the downlink messages, the UE 115 may select one or more default unified TCI states associated with a previously selected unified TCI codepoint. The unified TCI codepoint may map to one or more joint downlink and uplink unified TCI states, one or more downlink only unified TCI states, one or more uplink only unified TCI states, or a combination thereof. In some cases, the UE 115 may select the one or more default unified TCI states based on one or more conditions or parameters. The one or more conditions or parameters may include whether the UE 115 receives the unified TCI codepoint, the scheduling information, or both, in an sDCI or mDCI: whether the UE 115 is configured to enable multiple default unified TCI states: whether the UE 115 is configured to enable a default unified TCI state per network entity: types of unified TCI states included in the selected unified TCI codepoint: or any combination thereof, as discussed in more detail with reference to FIG. 4. Accordingly, the UE 115 may configure the default unified TCI state based on the selected unified TCI codepoint, which may improve reliability and reduce latency in mTRP communications.

Figure 2:
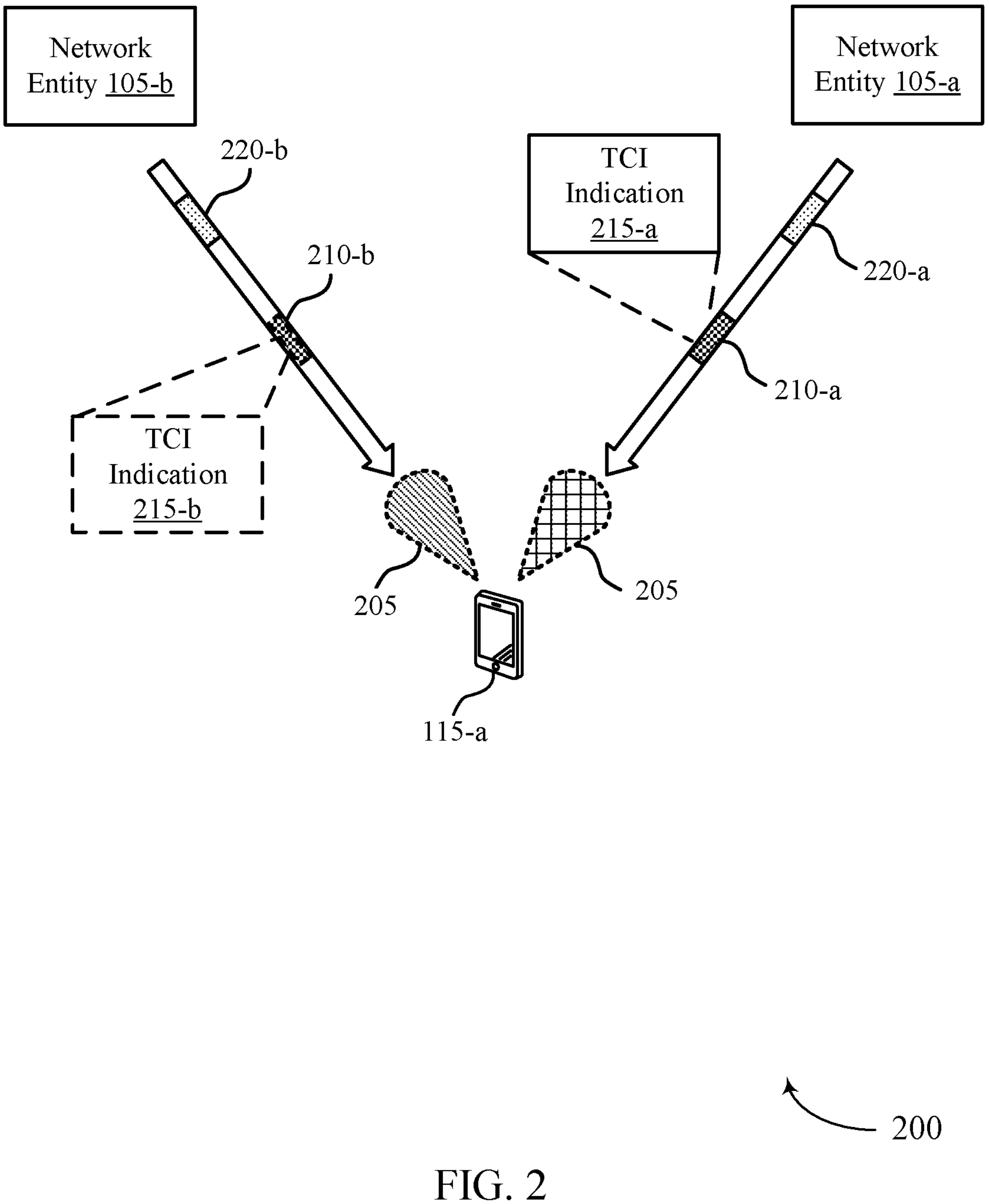

FIG. 2 illustrates an example of a wireless communications system 200 that supports determining default unified TCI states in accordance with one or more aspects of the present disclosure. In some examples, the wireless communications system 200 may implement aspects of the wireless communications system 100. For example, the wireless communications system 200 may include a network entity 105-*a*, a network entity 105-*b*, and a UE 115-*a*, which may be examples of a network entity 105 and a UE 115 respectively, as described herein with reference to FIG. 1. In some cases, the network entity 105-*a*, the network entity 105-*b*, and the UE 115-*a* may represent examples of multiple TRPs in wireless communication with a UE 115. While examples are discussed herein, any number of devices and device types may be used to accomplish implementations described in the present disclosure.

In some examples, the network entity 105-*a* and the network entity 105-*b* (or any number of network entities 105) may be in wireless communication (e.g., simultaneous wireless communication) with the UE 115-*a*. In order to participate in communications with the network entities 105, the UE 115-*a* may be configured with TCI states for use in transmitting and/or receiving transmissions between the network entities 105 and the UE 115-*a*. A TCI state may be indicative of a beam 205, such as a transmit beam, a receive beam, or both. Accordingly, the UE 115-*a* may receive, from the network entity 105-*a*, a TCI configuration message, which may include a configuration of one or more TCI states (e.g., TCI codepoints) for use at the UE 115-*a*. In some examples, the TCI configuration message may be an example of an RRC message that indicates a configuration of a set of TCI states. The network entity 105-*a* may transmit a TCI activation message (e.g., a MAC-CE message) associated with the configuration of TCI states, where the TCI activation message may activate a subset of the TCI states configured at the UE 115-*a*.

In some examples, such as in the case of mDCI, the TCI activation message may indicate a mapping of one or more unified TCI states to unified TCI codepoints, where each unified TCI may be associated with the network entity 105 that transmitted the mDCI. In some examples, such as in the case of sDCI, the TCI activation message may indicate a mapping of one or more unified TCI states to unified TCI codepoints, where the TCI states may be associated with different network entities 105, regardless of the network entity 105 that transmitted the sDCI. For example, an activated TCI codepoint may be mapped to one or more unified TCI states with different TCI types. In some cases, the TCI codepoint may be designated as Cx, where X may be a number identifying the TCI codepoint. The Cx may be set to either a one or a zero (e.g., $C_0=1$ or $C_0=0$) to indicate whether the next TCI state mapped to the TCI codepoint X (e.g., stop code), where a 1 may indicate that the next TCI state is associated with codepoint X but a 0 may indicate that the next TCI state is associated with a next codepoint. In some cases, the mapping may be exemplified by a data structure (e.g., a table). For example, Table 1 may be an example of activated unified TCI codepoints.

TABLE 1

| TCI Codepoint | TCI State |
|---|---|
| $C_0 = 1$ | DL only TCI #5 |
| $C_0 = 1$ | UL only TCI #10 |
| $C_0 = 0$ | Joint TCI #15 |
| $C_1 = 1$ | Joint TCI #7 |
| $C_1 = 0$ | DL only TCI #29 |
| $C_2 = 0$ | Joint TCI #35 |
| $C_3 = 1$ | Joint TCI #2 |
| $C_3 = 1$ | DL only TCI #43 |
| $C_3 = 0$ | UL only TCI #48 |

For example, a first TCI codepoint ($C_0$) may include a downlink only TCI (e.g., TCI #5), an uplink only TCI (e.g., TCI #10), and a joint TCI (e.g., TCI #15) in a third row. In some cases, the downlink only TCI state and the uplink only TCI state may be associated with a first network entity 105, and the joint TCI state may be associated with a second network entity 105. While the examples discussed are described in reference to a particular data structure, it is understood that many different mappings between various codepoints and TCI states with different TCI types are possible. Additionally, the UE 115-*a* may be configured with any number of activated TCI codepoints, and each codepoint may include any combination of TCI state identifiers. For example, TCI state #5 and TCI state #10 are merely examples.

A list of TCI state combinations is provided as examples of TCI state combinations that may be matched to each codepoint. In some cases, an order of the combination included in a control message (e.g., a MAC-CE) may be ignored. A first combination may be downlink only, uplink only, and joint (e.g., {DL-only, UL-only, Joint}); a second combination may be downlink only and joint; a third combination may be uplink only and joint; a fourth combination may be joint and joint; a fourth combination may be downlink only, downlink only, and uplink only; a fifth combination may be downlink only, uplink only, and uplink only; and a sixth combination may be downlink only, downlink only, uplink only, and uplink only. It is understood that different combinations may be possible, and may include any number of TCI state types.

Accordingly, to configure a UE 115-*a* for mTRP communications, one or more network entities 105 may configure the UE 115-*a* with a list of unified TCIs, and the corresponding TCI states (e.g., TCI types, TCI identifiers) associated with each TCI codepoint. Then, one or more both network entities 105 may activate a set of TCI codepoints based on the list of unified TCIs, and may then select one of the TCI codepoints from the activated TCI codepoints for the UE 115 to use in mTRP communions. For example, a network entity 105-*a* may transmit, to the UE 115-*a*, control information 210-*a*, such as one or more DCIs, which may include a TCI indication 215-*a*. The TCI indication 215-*a* may indicate a selected TCI codepoint indicative of one or more unified TCI states for use in communications with the network entities 105-*a* and 105-*b*. For example, the network entity 105-*a* may indicate $C_0$ to UE 115-*a*, where TCI #5 and TCI #10 may be associated with the network entity 105-*a*, and TCI #15 may be associated with the network entity 105-*b*.

In some cases, the same or a different control information message may include scheduling information of downlink messages 220-*a*, 220-*b*, or both (e.g., scheduling of the AP-CSI and/or PDSCH). In some cases, the scheduling information may indicate a subset of TCIs to be applied for the scheduling based on the unified TCIs indicated in the TCI indication 215-*a*. For example, the scheduling information may indicate that the TCI #5 is to be applied for the downlink messages 220-*a*, 220-*b*, or both (e.g., the schedulings), or indicate that the TCI #5 and TCI #10 is to be applied for the downlink messages 220-*a*, 220-*b*, or both (e.g., the schedulings), if the TCI codepoint $C_0$ is indicated by the TCI indication 215-*a*. In some cases, the UE 115-*a* may take time to process the control information message and switch to a beam 205 associated with the corresponding downlink message 220. To allow for the time the UE 115-*a* takes to complete processing the control information message, the UE 115 may be configured with a scheduling offset, where the start of the scheduling offset may be prompted by the control information message. Accordingly, and as described in more detail with reference to FIG. 4, a network entity 105-*a* may schedule the UE 115-*a* to receive the downlink messages 220-*a* and 220-*b* after an amount of time (e.g., a scheduling offset window). However, in some cases, the network entity 105-*a* may schedule the downlink messages 220-*a* and 220-*b* during the scheduling offset window. In such cases, the UE 115-*a* may not have time to process the control information message, and/or switch to a beam 205 indicated by the control information message. Therefore, the UE 115-*a* may be configured to select one or more default unified TCI states, such as from the TCI codepoint indicated in TCI indication 215-*a*, based on one or more conditions or parameters, as described herein with reference to FIG. 4, in order to receive the scheduled downlink transmissions. For example, during an mTRP operation, one or more default beams 205 used to receive the downlink messages 220-*a* and 220-*b* (e.g., the PDSCH and/or AP CSI-RS) may be based on the selected unified TCIs (e.g., the selected unified TCIs consistent with those used by dedicated data/control). Accordingly, the UE 115-*a* may receive the downlink messages 220-*a* and 220-*b* while operating in the one or more default unified TCI states.

While the examples discussed herein are in reference to sDCI procedures (e.g., the control information 210-*a* indicating the selected TCI codepoint for both of the network entities 105-*a* and 105-*b*), the examples are also applicable to mDCI procedures. For example, the network entity 105-*b* may transmit control information 210-*b*, such as one or more DCIs, which may include a TCI indication 215-*b*. The TCI indication 215-*b* may indicate a selected TCI codepoint and one or more unified TCI states for use in communications with the network entity 105-*b*, such that the UE 115 may receive an indication of TCI per network entity 105.

Figure 3:
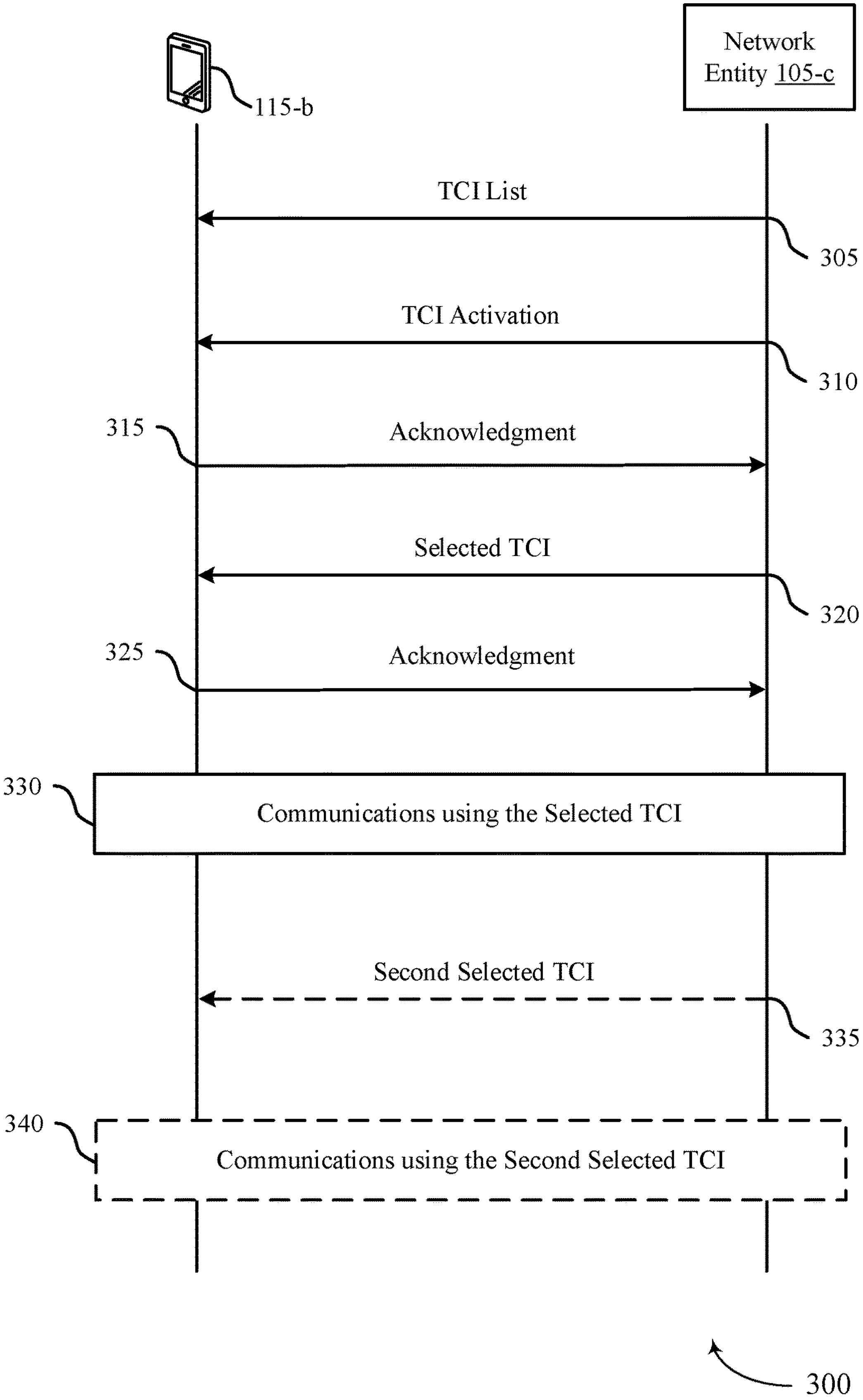
FIG. 3 through 5 illustrate examples of process flows that support determining default unified TCI states in accordance with one or more aspects of the present disclosure.

FIG. 3 illustrates an example of a process flow 300 that supports determining default unified TCI states in accordance with one or more aspects of the present disclosure. In some examples, the process flow 300 may implement or be implemented by aspects of the wireless communications systems 100 and 200 as described with reference to FIGS. 1 and 2, respectively. For example, the process flow 300 may be implemented by a network entity 105-*c* and a UE 115-*b*, which may be respective examples of network entities 105 and UEs 115 as described with reference to FIGS. 1 and 2. In the following description of the process flow 300, the operations between the network entity 105-*c* and the UE 115-*b* may be transmitted in a different order than the example order shown, or the operations performed by the network entity 105-*c* and the UE 115-*b* may be performed in different orders or at different times. Some operations may also be omitted from the process flow 300, and other operations may be added to the process flow 300. In some cases, the network entity 105-*c* may represent one or more network entities 105.

At 305, the network entity 105-*c* may transmit, to the UE 115-*b*, a message indicating a TCI list (e.g., a set of TCIs). In some cases, the TCI list may be indicated by a TCI configuration message (e.g., an RRC message, or some other control message) that may configure the UE 115-*b* with a list of TCIs that may be used for communications between the UE 115-*b* and the network entity 105-*c*. The TCI list may include a set of unified TCIs, where each TCI may be associated with a certain type. For example, the types of unified TCIs may include downlink only, uplink only, or both downlink and uplink (e.g., joint). In some cases, the message may indicate the one or more TCI states (e.g., TCI types, TCI identifiers) associated with each TCI.

At 310, the network entity 105-*c* may transmit, to the UE 115-*b*, a TCI activation message. The TCI activation message may activate a subset of one or more unified TCIs (e.g., as one or more unified TCI codepoints) of the TCI list configured at the UE 115-*b*. In some examples, the TCI activation message may indicate a mapping between unified TCI codepoints and one or more unified TCI states with different TCI types, as described herein with reference to FIG. 2. For example, the TCI activation message may indicate Table 1, as described with reference to FIG. 2. In some cases, the TCI activation message may be included in control signaling, such as a MAC-CE, an RRC, or other types of control signaling. At 315, the UE 115-*b* may transmit a feedback message (e.g., a positive acknowledgment (ACK), a negative acknowledgment (NACK)) indicative of whether the UE 115-*b* received the TCI activation message from the network entity 105-*c*.

At 320, the network entity 105-*c* may transmit, to the UE 115-*b*, an indication of a selected unified TCI codepoint from the set of activated TCI codepoints. In some cases, a first set of selected unified TCIs may be included in a first message (e.g., a unified TCI indication DCI). In some examples, the unified TCI indication DCI may be associated with a DCI format (e.g., a DCI format 1_1 or 1_2) with or without downlink assignment. The UE 115-*b* may decode the first message, identify the first set of selected unified TCIs based on the selected unified TCI codepoint, and switch to the selected unified TCI for use in communicating with at least the network entity 105-*c*. For example, the selected unified TCI codepoint may have an identification number of two (e.g., $C_2$). According to the mapping example indicated in the description of FIG. 2 (e.g., Table 1), the selected unified TCI codepoint maps to a single unified TCI state associated with a joint TCI state. Accordingly, the UE 115-*b* may receive the one or more downlink messages while operating in accordance with the joint TCI state. In some cases, the UE 115-*b* may operate according to the joint TCI state until a subsequent different TCI codepoint is indicated to the UE 115-*b*. Such configuration and activation of codepoints, in some cases, may be referred to as unified TCI. Additionally, or alternatively, the use of a mapping indicated by Table 1 (e.g., using a TCI codepoint to indicate joint uplink or downlink states, or an uplink and a downlink TCI state) may be referred to as unified TCI (e.g., a unified TCI framework).

In some examples, the first message may include scheduling information for one or more downlink messages (e.g., AP-CSI messages, PDSCH messages, or some other downlink message) that the network entity 105-*c* may transmit to the UE 115-*b* at a later time. At 325, the UE 115-*b* may transmit feedback (e.g., ACK or NACK) associated with the indication of the selected unified TCI to the network entity 105-*c*.

At 330, the network entity 105-*c* may communicate with the UE 115-*b* using the first set of selected unified TCIs. For example, the network entity 105-*c* may transmit, to the UE 115-*b*, the scheduled downlink messages. The UE 115-*b* may receive the scheduled downlink messages on a beam associated with the first set of selected unified TCIs. In some cases, the beam may be for one or more downlink channels and/or reference signals, one or more uplink channels and/or reference signals, a common beam for one or more downlink channels and/or reference signals plus one or more uplink channels and/or reference signals, or any combination thereof. In the example of the joint TCI, the beam may be a common beam for downlink and uplink channels and/or reference signals. In some cases, the network entity 105-*c* may transmit the downlink messages to the UE 115-*b* as part of a single TRP (sTRP) operation or multiple network entities 105-*c* may transmit at least a portion of the downlink messages to the UE 115-*b* as part of a mTRP operation. In some cases, one or more of the selected unified TCI states of the selected unified codepoint may be used as one or more default TCI states. In some cases, the UE 115-*b* may use the one or more of the selected unified TCI states as default TCI states until the UE 115-*b* receives a message including a second selected unified TCI states.

For example, at 335, the network entity 105-*c* may optionally transmit to the UE 115-*b* a second message. In some cases, the second message may include an indication of a second set of selected unified TCIs for second downlink messages scheduled by the network entity 105-*c* (e.g., an updated unified TCI). However, the second downlink messages may be scheduled for reception by the UE 115-*b* prior to an end of an offset window associated with processing the indication of the second selected unified TCI. The UE 115-*b* may select one or more default unified TCI states based on one or more conditions or parameters, as described herein with reference to FIG. 4, and, at 340, receive the second downlink messages according to the selected one or more default unified TCI states.

Figure 4:
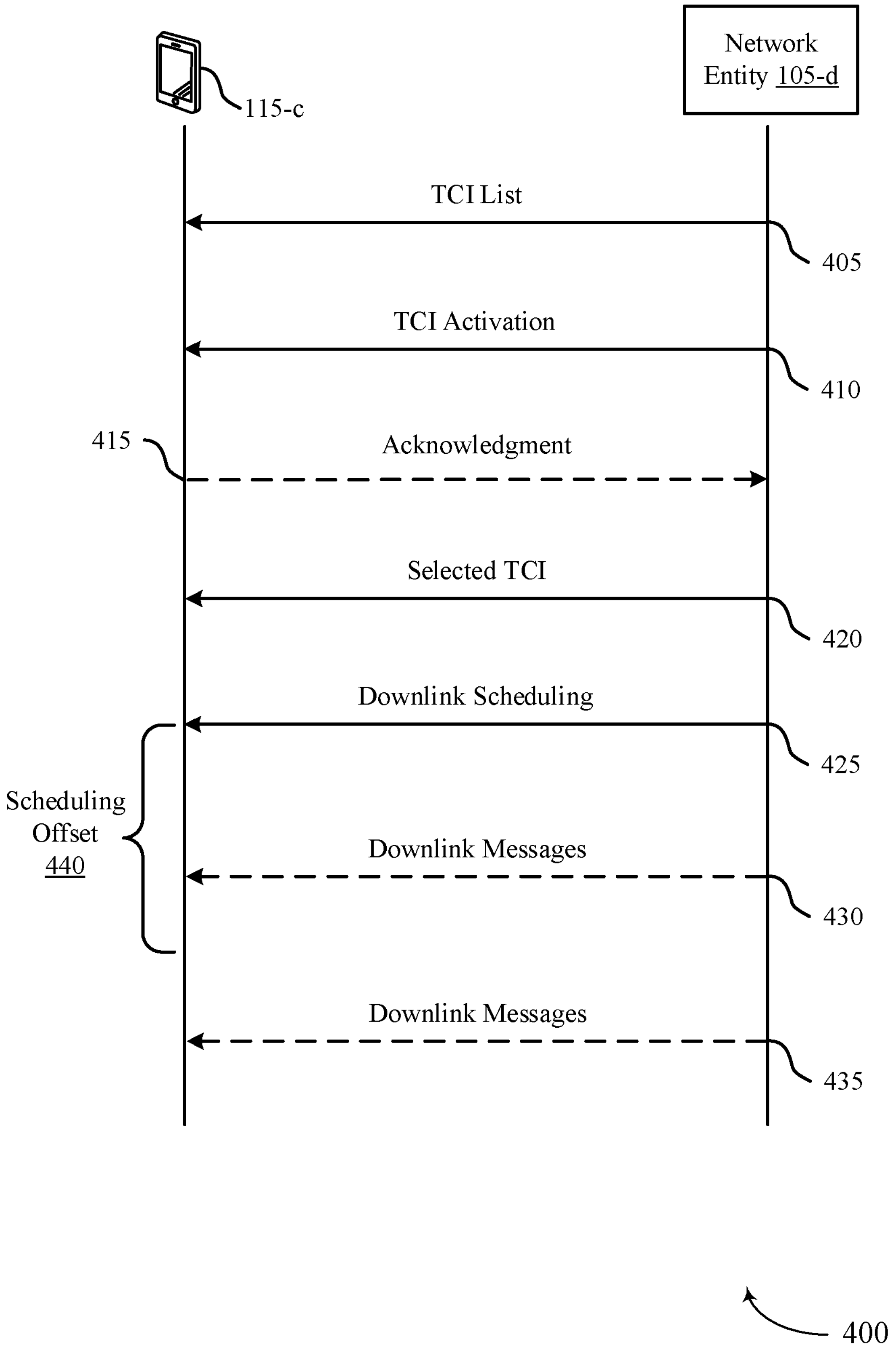

FIG. 4 illustrates an example of a process flow 400 that supports determining default unified TCI states in accordance with one or more aspects of the present disclosure. In some examples, the process flow 400 may implement or be implemented by aspects of the wireless communications systems 100 and 200, and/or process flow 300, as described with reference to FIGS. 1 through 3, respectively. For example, the process flow 400 may be implemented by a network entity 105-*d* and a UE 115-*c*, which may be respective examples of network entities 105 and UEs 115 as described with reference to FIGS. 1 through 3. In the following description of the process flow 400, the operations between the network entity 105-*d* and the UE 115-*c* may be transmitted in a different order than the example order shown, or the operations performed by the network entity 105-*d* and the UE 115-*c* may be performed in different orders or at different times. Some operations may also be omitted from the process flow 400, and other operations may be added to the process flow 400. In some cases, the network entity 105-*d* may represent one or more network entities 105.

At 405, the network entity 105-*d* may transmit, to the UE 115-*c*, a TCI list (e.g., a set of TCIs). In some cases, the TCI list may be indicated by a TCI configuration message (e.g., RRC message, or some other control message) that may configure the UE 115-*c* with a list of TCIs for communications between the UE 115-*c* and at least the network entity 105-*d*. The TCI list may include a set of unified TCIs, where each TCI may be associated with different type of unified TCI. For example, the types of unified TCI may include downlink only, uplink only, or both downlink and uplink (e.g., joint). The TCI list message may indicate a mapping between unified TCI codepoints and one or more unified TCI states associated with different TCI types, and/or TCI identifiers.

At 410, the network entity 105-*d* may transmit, to the UE 115-*c*, a TCI activation message. The TCI activation message may activate a subset of one or more unified TCIs of the TCI list configured at the UE 115-*c*. In some examples, the TCI activation message may indicate a mapping between unified TCI codepoints and one or more unified TCI states with different TCI types (e.g., TCI identifiers), as described herein with reference to FIG. 2 (e.g., Table 1). In some cases, the TCI activation message may be included in control signaling, such as a MAC-CE, an RRC, or some other type of control signaling. At 415, the UE 115-*b* may transmit feedback (e.g., ACK or NACK) associated with the TCI activation message to the network entity 105-*d*, such as to indicate whether the UE 115-*c* successfully received and/or decoded the activation message.

At 420, the network entity 105-*d* may transmit an indication of a first set of selected unified TCIs to the UE 115-*c* (e.g., a selected unified TCI codepoint). In some cases, the first set of selected unified TCIs may be included in a first message (e.g., a unified TCI indication DCI). The UE 115-*c* may decode the first message, identify the first set of selected unified TCI based on the indication of the selected unified TCI codepoint, and switch to the first set of selected unified TCIs for use in communicating with at least the network entity 105-*d*. For example, the selected unified TCI codepoint may have an identification number of zero (e.g., $C_0$). According to the mapping example indicated in Table 1 of FIG. 2, the selected unified TCI codepoint maps to multiple unified TCI states associated with a downlink only TCI, an uplink only TCI, and a joint TCI respectively, where the first set of selected unified TCIs may include multiple downlink applicable unified TCI states including a downlink only TCI, and a joint TCI. Accordingly, the UE 115-*c* may receive downlink messages while operating in one or more of the TCI states (e.g., the downlink only TCI and/or the joint TCI).

At 425, the network entity 105-*d* may transmit, to the UE 115-*c*, a downlink scheduling message (e.g., a scheduling DCI) that may include scheduling information for the downlink messages (e.g., AP-CSI messages, PDSCH messages, or some other downlink message). In some cases, the downlink scheduling message may include a second indication of a second set of selected TCIs (e.g., which subset of TCIs to be applied based on the first set of selected unified TCIs) associated with the downlink messages that the network entity 105-*c* may transmit to the UE 115-*b* at a later time. For example, the downlink scheduling message may include a TRP switching indication as a second indication of a second set of selected TCIs to indicate that the downlink only TCI in the first set of selected unified TCIs may be applied for the scheduled downlink messages, or the downlink scheduling message may include a TRP switching indication as a second indication of a second set of selected TCIs to indicate that the downlink only TCI and a joint TCI in the first set of selected unified TCIs may be applied for the scheduled downlink messages. In some cases, a scheduling offset window 440 associated with processing the downlink scheduling message, may start based on the downlink scheduling message. For example, the scheduling offset window 440 may start when the network entity 105-*d* transmits the downlink scheduling message or when the UE 115-*c* receives the downlink scheduling message, among other examples.

In some examples, the UE 115-*c* may receive the scheduled downlink messages (e.g., AP-CSI messages, PDSCH messages, or some other downlink message) after the scheduling offset window 440, and the UE 115-*c* may finish processing the second indication of the second set of selected unified TCIs, and switch to the second set of indication TCIs. Accordingly, at 435, the UE 115-*c* may receive the downlink messages while operating in the second set of selected unified TCIs for the scheduled downlink messages after the scheduling offset window 440.

However, in some examples, the UE 115-*c* may identify that the downlink messages are scheduled for reception prior to the end of the scheduling offset window 440 (e.g., when the scheduling offset between the scheduling message and the corresponding scheduled downlink messages is less than a time DurationForQCL parameter for PDSCH messages and a beamSwitchTiming parameter for AP CSI-RS). Accordingly, the UE 115-*c* may select one or more default TCI states for reception of the scheduled downlink messages based on one or more conditions or parameters. For example, for unified TCI in mTRP operation, the PDSCH and/or AP CSI-RS default beam can be based on the selected unified TCIs, which may be consistent with those used by UE-dedicated PDCCH and PDSCH. In some cases, the UE 115-*c* may be configured or preconfigured to select the one or more default TCI states in accordance with a default rule. For example, the default rule may be associated with selecting a lowest activated codepoint with two downlink applicable TCIs.

In some cases, the one or more conditions or parameters may include whether the UE 115-*c* receives the unified TCI codepoint, the scheduling information, or both, in an sDCI or mDCI based mTRP operation. In some examples of sDCI based mTRP operation and the case that at least one activated unified TCI codepoint (e.g., from the TCI activation message) includes multiple downlink applicable unified TCI states (e.g., two unified TCI states), the UE 115-*c* may additionally be configured (e.g., by an RRC message, a MAC-CE message, or both) or preconfigured to support multiple (e.g., two) default unified TCI states (e.g., enableTwoDefaultTCI-States is enabled for the UE 115-*c*). In such cases, and when the selected unified TCI codepoint (e.g., in the first set of selected unified TCIs in the unified TCI indication DCI) is mapped to multiple (e.g., two) downlink applicable TCIs (e.g., for dedicated PDCCH and/or PDSCH), such as $C_0$ in Table 1, then the multiple downlink applicable TCIs of the selected TCIs may serve as multiple (e.g., two) default beams (e.g., instead of following the default rule). For example, DL only TCI #5 and Joint TCI #15 may serve as the two default TCI states for receiving the schedule downlink messages. However, when the selected unified TCI codepoint is mapped to a single downlink applicable TCI (e.g., a joint unified TCI or a downlink only TCI), such as $C_2$ of Table 1, then a single default TCI state may be used for the scheduled downlink messages (e.g., at least for dedicated PDCCH/PDSCH). In some implementations, the single default TCI state may follow the single downlink applicable TCI (e.g., Joint TCI #35 of $C_2$). In some other cases, when the selected unified TCI codepoint is mapped to a single downlink applicable TCI, the UE 115-*d* may select two default beams that follow the lowest activated unified TCI codepoint with multiple (e.g., two) downlink applicable TCIs. For example, as described herein with reference to FIG. 2, the lowest activated unified TCI codepoint with multiple downlink applicable TCIs is the first unified TCI codepoint (e.g., $C_0$). Accordingly, the UE 115-*d* may select the lowest activated unified TCI codepoint with multiple downlink applicable TCIs, and apply the downlink only TCI state #5 and the joint unified TCI state #15 as the two default beams.

In some examples of sDCI reception and the case that at least one activated unified TCI codepoint (e.g., from the TCI activation message) includes multiple downlink applicable unified TCI states, the UE 115-*c* may additionally be configured (e.g., by the RRC message, the MAC-CE message, or some other control message) or preconfigured to support one default unified TCI states (e.g., enable TwoDefaultTCI-States is disabled). In some cases, the UE 115-*c* may not be additionally configured (e.g., by the RRC message, the MAC-CE message, or some other control message) or preconfigured to support multiple (e.g., two) default unified TCI states. In such cases, and when the selected unified TCI codepoint (e.g., in the first set of selected unified TCIs) is mapped to multiple (e.g., two) downlink applicable TCIs (e.g., at least for dedicated PDCCH and/or PDSCH) then a single default beam may be used by the UE 115-*c* that follows the first selected downlink applicable TCI. In some other examples, the UE 115-*c* may follow the second selected downlink applicable TCI, or may follow a configuration or a rule (e.g., a default rule) to select the first or second downlink applicable TCI. For example, if $C_0$ is the selected TCI codepoint, then the first selected downlink applicable TCI is downlink only TCI #5. When the selected unified TCI codepoint is mapped to a single downlink applicable TCI (e.g., at least for dedicated PDCCH and/or PDSCH) then the single default beam may be the single selected downlink applicable TCI. In such cases, and when the selected unified TCI codepoint is mapped to single downlink applicable TCI (e.g., at least for dedicated PDCCH and/or PDSCH) then a single default beam may be used by the UE 115-*c* that follows the selected downlink applicable TCI.

In some examples of mDCI reception in mTRP operation (e.g., multiple network entities 105-*d*), and in the case that at least one CORESET is configured and/or preconfigured with a CORESET index (e.g., a CORESETPoolIndex), the one or more conditions or parameters may include whether the UE 115-*c* is configured to enable a default unified TCI state per network entity 105-*d* (e.g., with enableDefaultTCI-StatePerCoresetPoolIndex). When the UE 115-*c* is enabled with the default unified TCI state per network entity 105-*d*, then the selected downlink applicable TCI for the respective network entity 105-*d* may serve as the default beam. For example, downlink messages (e.g., PDSCH and/or AP CSI-RS) scheduled by a first network entity 105-*d* (e.g., with a first CORESETPoolIndex) according to a first DCI associated with the first network entity 105-*d* may be received by the UE 115-*c* according to a first selected downlink applicable TCI, selected by the first network entity 105-*d*. Similarly, downlink messages (e.g., PDSCH and/or AP CSI-RS) scheduled by a second network entity 105-*d* (e.g., with a second CORESETPoolIndex) according to a second DCI associated with the second network entity 105-*d* may be received by the UE 115-*c* according to a second selected downlink applicable TCI, selected by the second network entity 105-*d*. Accordingly, for a PDSCH and/or AP CSI-RS scheduled by a DCI associated with a CORESETPoolIndex, the selected downlink applicable TCI for this CORESETPoolIndex may serve as the default beam used when scheduling offset is less than timeDurationForQCL for PDSCH and beamSwitchTiming for AP CSI-RS, instead of following a default rule in which the lowest CORESET ID among CORESETs associated with this CORESETPoolIndex in latest monitored slot is selected as the default.

When the default unified TCI state per network entity 105-*d* is disabled at the UE 115-*c*, however, then the default beam is the downlink applicable TCI associated with a lowest network entity identification (e.g., CORESET ID) in a most recent (e.g., latest) monitored slot.

At 430, the UE 115-*c* may receive the downlink messages while operating in the selected one or more default unified TCI states.

Figure 5:
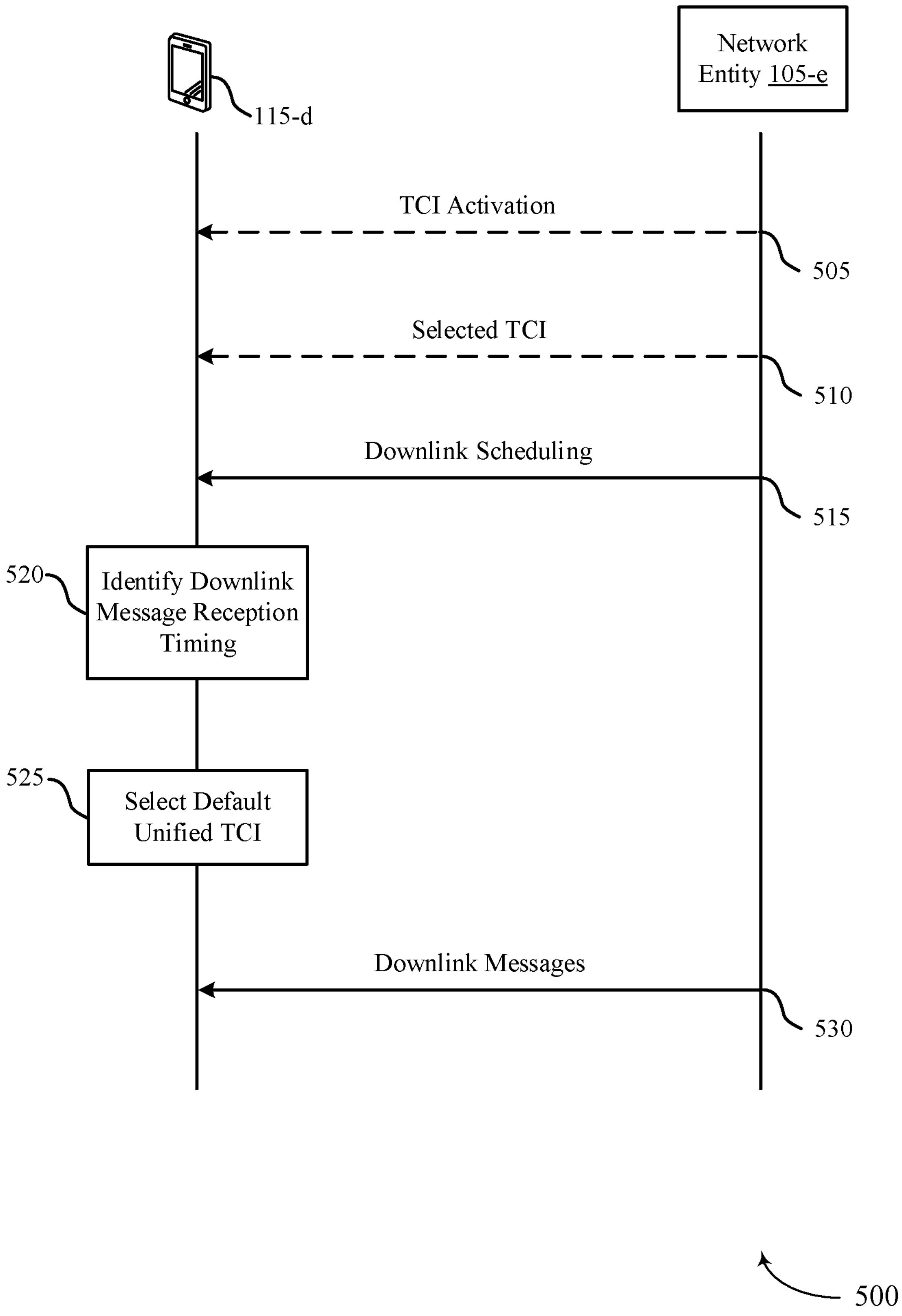

FIG. 5 illustrates an example of a process flow 500 that supports determining default unified TCI states in accordance with one or more aspects of the present disclosure. In some examples, the process flow 500 may implement or be implemented by aspects of the wireless communications systems 100 and 200, and/or process flows 300 and 400, as described with reference to FIGS. 1 through 4, respectively. For example, the process flow 500 may be implemented by a network entity 105-*e* and a UE 115-*d*, which may be respective examples of network entities 105 and UEs 115 as described with reference to FIGS. 1 through 4. In the following description of the process flow 500, the operations between the network entity 105-*e* and the UE 115-*d* may be transmitted in a different order than the example order shown, or the operations performed by the network entity 105-*e* and the UE 115-*d* may be performed in different orders or at different times. Some operations may also be omitted from the process flow 500, and other operations may be added to the process flow 500. In some cases, the network entity 105-*e* may represent one or more network entities 105.

At 505, the network entity 105-*e* may optionally transmit, to the UE 115-*d*, a signal indicating a set of one or more activated TCI codepoints (e.g., a TCI activation message). For example, the signal may activate a subset of one or more unified TCIs (e.g., TCI codepoints) of a TCI list configured and/or preconfigured at the UE 115-*d*. Each activated unified TCI codepoint may be associated with one or more unified TCI states (e.g., of a certain TCI type, associated with a TCI state identifier), such that each activated unified TCI may include one or more downlink TCI states, one or more uplink TCI states, and/or one or more joint TCI states. In some examples, a joint TCI state and a downlink TCI state may be downlink applicable TCI states. In some examples, the TCI activation message may be included in control signaling, such as a MAC-CE, an RRC, or other types of control signaling.

At 510, the network entity 105-*e* may optionally transmit a first indication of a first selected unified TCI to the UE 115-*d*. In some cases, the first selected unified TCI may be included in a message (e.g., a unified TCI indication DCI). The UE 115-*c* may decode the message, identify a selected unified TCI codepoint based on the first indication of the first selected unified TCI, and switch to the first selected unified TCI for use in communicating with the network entity 105-*e*. In some cases, the first selected unified TCI may be included in the subset of one or more unified TCIs. In some examples, the selected unified TCI codepoint is associated with dedicated downlink control channel messages, dedicated downlink shared channel messages, or both.

At 515, the network entity 105-*e* may transmit, to the UE 115-*d*, a downlink control message (e.g., a scheduling DCI) that may include scheduling information for the downlink messages (e.g., AP-CSI messages, PDSCH messages, or both) and a second indication of a second selected unified TCI associated with the downlink messages that the network entity 105-*e* may transmit to the UE 115-*d* at a later time. In some examples, the second indication of the second selected unified TCI may be an initial indication of a selected unified TCI (e.g., when the network entity 105-*e* refrains from transmitting the first indication). In some cases, an offset window associated with processing the second indication of the second selected unified TCI, may start based on the downlink control message. For example, the offset window may start when the network entity 105-*e* transmits the downlink scheduling message or when the UE 115-*d* receives the downlink control message, among other examples.

At 520, the UE 115-*d* may identify a downlink message reception timing. For example, the UE 115-*d* may identify that the downlink messages are scheduled for reception prior to the end of the offset window.

At 525, the UE 115-*d* may select one or more default unified TCI states for reception of the downlink messages based on the downlink control message and an mTRP operation. For example, in some cases, the UE 115-*d* may select two default unified TCI states from a selected unified TCI codepoint. The selection may be based on the selected unified TCI codepoint including at least two downlink applicable TCI states, the UE 115-*d* being enabled for two default TCI states, the downlink control message being an sDCI message, or any combination thereof.

In some cases, the UE 115-*d* may select a single default unified TCI state from the selected unified TCI codepoint. The selection may be based on the selected unified TCI codepoint including a single downlink applicable TCI state, irrespective of whether the UE 115-*d* is enabled for two default TCI states, the UE 115-*d* being enabled for a single default TCI state, irrespective of whether the selected unified TCI codepoint comprises at least two downlink applicable TCI states, the single default unified TCI state being a first downlink applicable TCI state of the selected unified TCI codepoint, the downlink control message being an sDCI message or an mDCI message, at least one CORESET being associated with a CORESET pool index, the UE 115-*d* being enabled for a default TCI state per CORESET pool index (e.g., the downlink control message being associated with the CORESET pool index), or any combination thereof.

In some cases, the UE 115-*d* may select the one or more default unified TCI states from a unified TCI codepoint other than the selected unified TCI codepoint (e.g., in accordance with a default rule). The selection may be based on the UE 115-*d* being enabled for two default TCI states and the selected unified TCI codepoint including one downlink applicable TCI state, the unified TCI codepoint being a lowest codepoint in the subset of activated unified TCI codepoints that includes at least two downlink applicable TCI states, or both.

In some cases, the UE 115-*d* may select the one or more default unified TCI states by selecting a downlink applicable TCI state for a lowest CORESET identifier in a latest monitored slot (e.g., in accordance with a default rule). The selection may be based on the downlink control message being an mDCI message and at least one CORSET being associated with a CORESET pool index, the UE 115-*d* being disabled for a default TCI state per COREST pool index, or both.

At 530, the UE 115-*d* may receive the downlink messages while operating in the one or more default unified TCI states.

Figure 6:
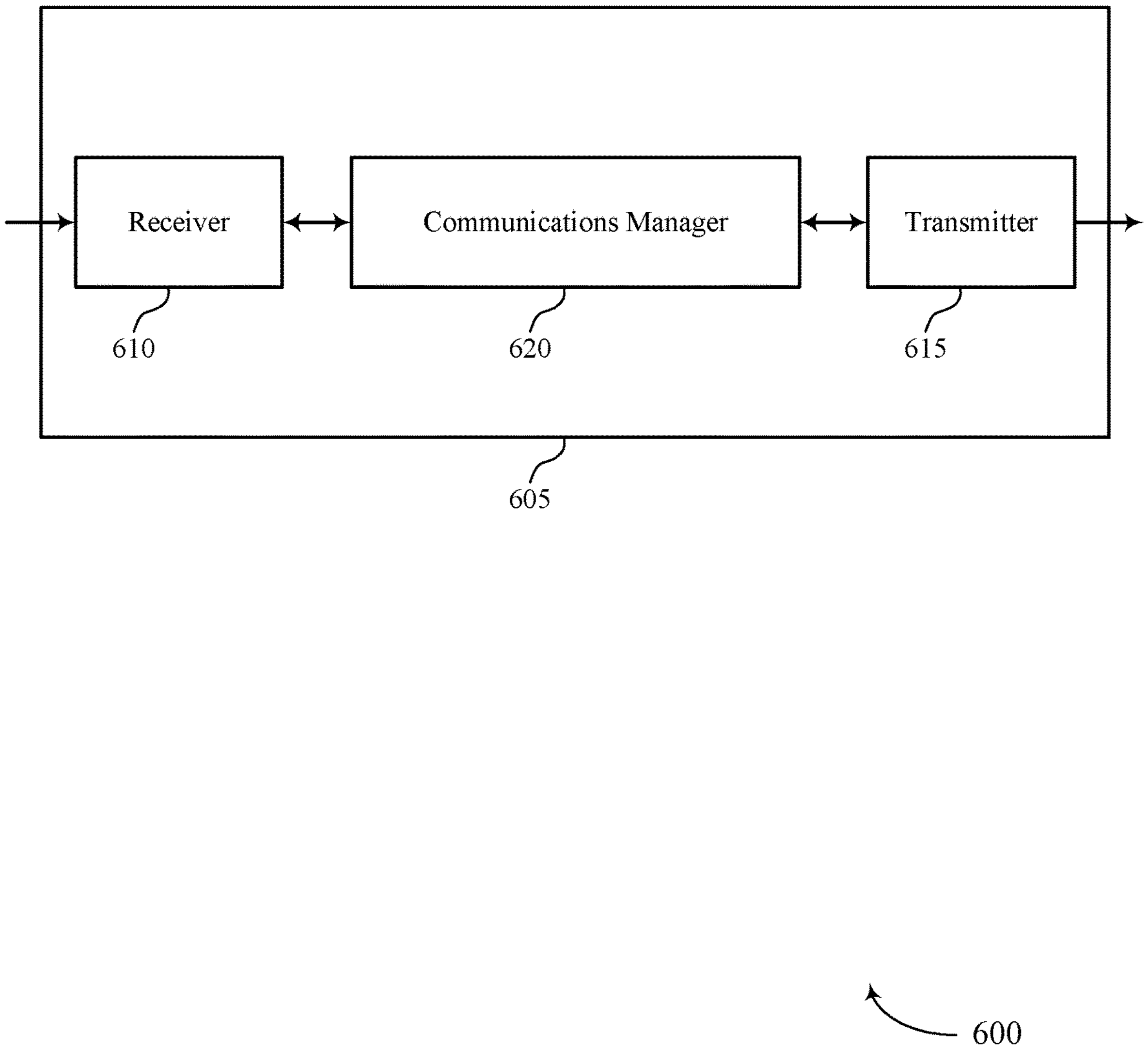
FIGS. 6 and 7 show block diagrams of devices that support determining default unified TCI states in accordance with one or more aspects of the present disclosure.

FIG. 6 shows a block diagram 600 of a device 605 that supports determining default unified TCI states in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to determining default unified TCI states). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to determining default unified TCI states). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of determining default unified TCI states as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for receiving a DCI message scheduling one or more downlink messages for reception during mTRP operation of a network entity, the DCI message including an indication of one or more TCI states for reception of the one or more downlink messages. The communications manager 620 may be configured as or otherwise support a means for identifying that the one or more downlink messages are scheduled for reception prior to an end of an offset window associated with processing the indication of the one or more TCI states, where a start of the offset window is based at least part on the DCI message. The communications manager 620 may be configured as or otherwise support a means for selecting one or more default unified TCI states based on the DCI message and the mTRP operation. The communications manager 620 may be configured as or otherwise support a means for receiving the one or more downlink messages while operating in the one or more default unified TCI states based on an arrival of the one or more downlink messages occurring prior to the end of the offset window.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for flexibility for TCI operations and more efficient utilization of communication resources.

Figure 7:
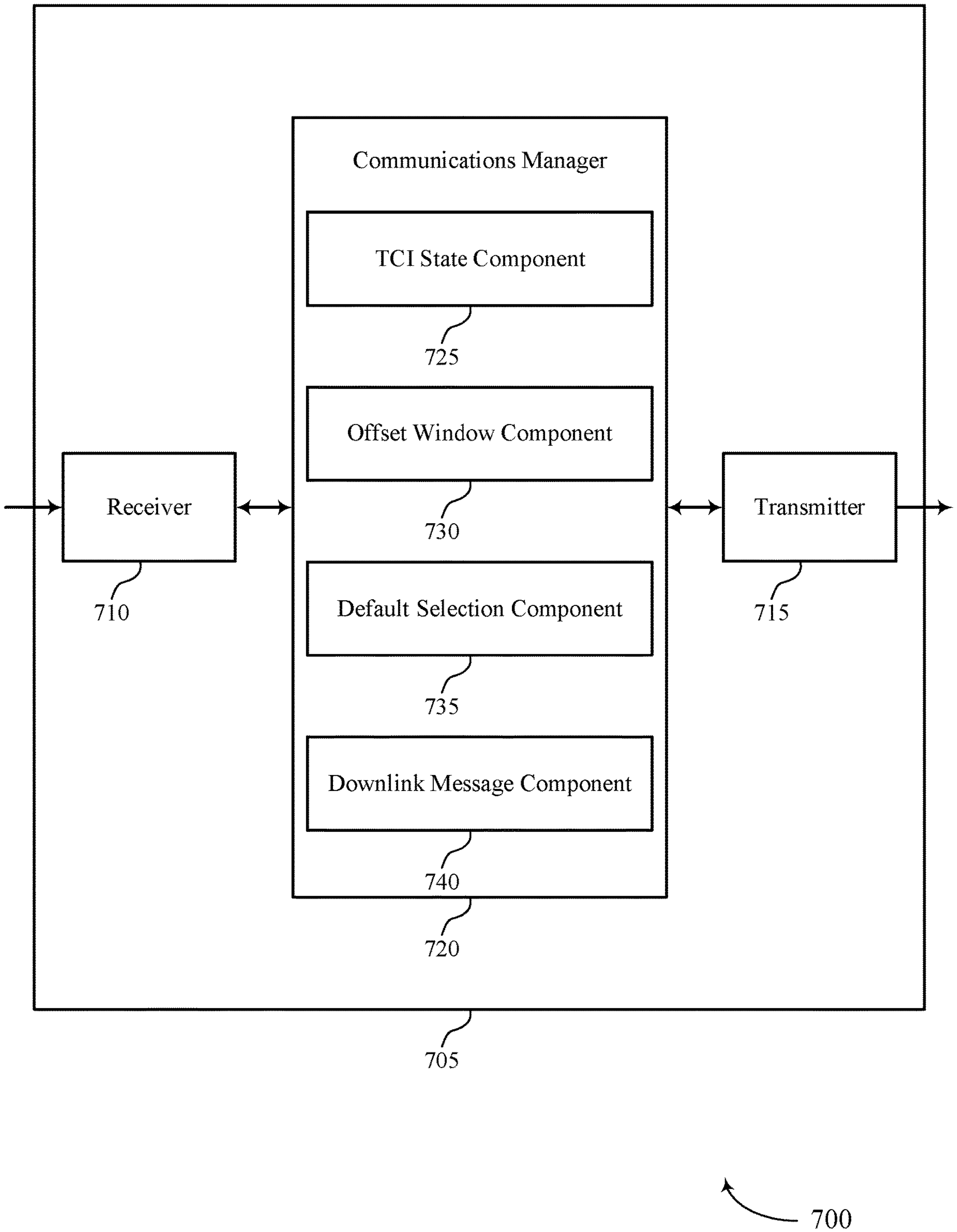

FIG. 7 shows a block diagram 700 of a device 705 that supports determining default unified TCI states in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to determining default unified TCI states). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to determining default unified TCI states). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of determining default unified TCI states as described herein. For example, the communications manager 720 may include a TCI state component 725, an offset window component 730, a default selection component 735, a downlink message component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The TCI state component 725 may be configured as or otherwise support a means for receiving a DCI message scheduling one or more downlink messages for reception during mTRP operation of a network entity, the DCI message including an indication of one or more TCI states for reception of the one or more downlink messages. The offset window component 730 may be configured as or otherwise support a means for identifying that the one or more downlink messages are scheduled for reception prior to an end of an offset window associated with processing the indication of the one or more TCI states, where a start of the offset window is based at least part on the DCI message. The default selection component 735 may be configured as or otherwise support a means for selecting one or more default unified TCI states based on the DCI message and the mTRP operation. The downlink message component 740 may be configured as or otherwise support a means for receiving the one or more downlink messages while operating in the one or more default unified TCI states based on an arrival of the one or more downlink messages occurring prior to the end of the offset window.

Figure 8:
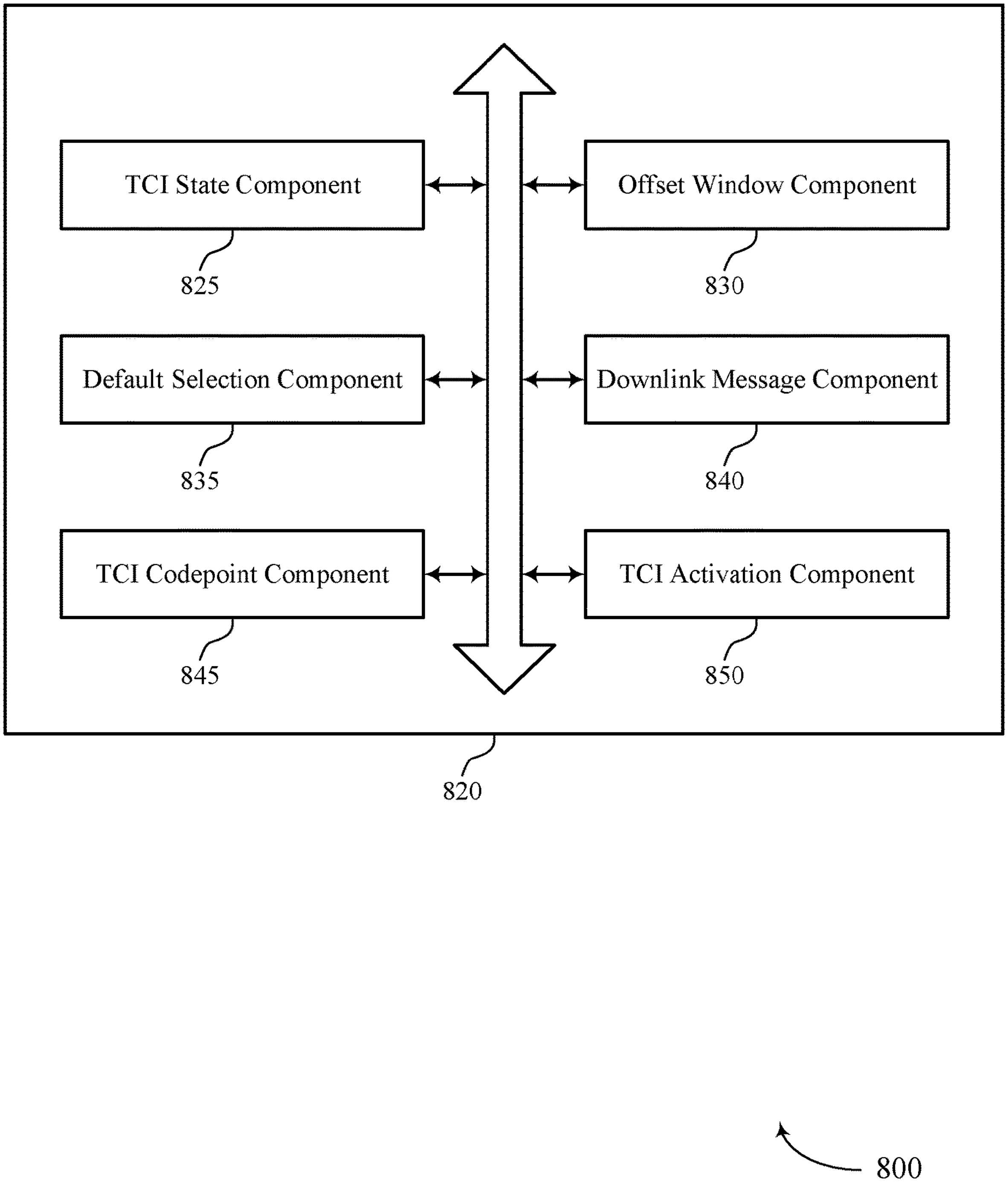
FIG. 8 shows a block diagram of a communications manager that supports determining default unified TCI states in accordance with one or more aspects of the present disclosure.

FIG. 8 shows a block diagram 800 of a communications manager 820 that supports determining default unified TCI states in accordance with one or more aspects of the present disclosure. The communications manager 820 may be an example of aspects of a communications manager 620, a communications manager 720, or both, as described herein. The communications manager 820, or various components thereof, may be an example of means for performing various aspects of determining default unified TCI states as described herein. For example, the communications manager 820 may include a TCI state component 825, an offset window component 830, a default selection component 835, a downlink message component 840, a TCI codepoint component 845, a TCI activation component 850, or any combination thereof. Each of these components may communicate, directly or indirectly, with one another (e.g., via one or more buses).

The communications manager 820 may support wireless communications at a UE in accordance with examples as disclosed herein. The TCI state component 825 may be configured as or otherwise support a means for receiving a DCI message scheduling one or more downlink messages for reception during mTRP operation of a network entity, the DCI message including an indication of one or more TCI states for reception of the one or more downlink messages. The offset window component 830 may be configured as or otherwise support a means for identifying that the one or more downlink messages are scheduled for reception prior to an end of an offset window associated with processing the indication of the one or more TCI states, where a start of the offset window is based at least part on the DCI message. The default selection component 835 may be configured as or otherwise support a means for selecting one or more default unified TCI states based on the DCI message and the mTRP operation. The downlink message component 840 may be configured as or otherwise support a means for receiving the one or more downlink messages while operating in the one or more default unified TCI states based on an arrival of the one or more downlink messages occurring prior to the end of the offset window.

In some examples, the TCI codepoint component 845 may be configured as or otherwise support a means for receiving, prior to the DCI message, a message indicative of a selected unified TCI codepoint for use by the UE in communications with the network entity.

In some examples, to support selecting the one or more default unified TCI states, the default selection component 835 may be configured as or otherwise support a means for selecting two default unified TCI states from the selected unified TCI codepoint.

In some examples, selecting from the selected unified TCI codepoint is based on the selected unified TCI codepoint including at least two downlink applicable TCI states.

In some examples, selecting the two default unified TCI states is based on the UE being enabled for two default TCI states.

In some examples, selecting the two default unified TCI states is based on the DCI message being a sDCI message.

In some examples, to support selecting the one or more default unified TCI states, the default selection component 835 may be configured as or otherwise support a means for selecting one default unified TCI state from the selected unified TCI codepoint.

In some examples, selecting the one default unified TCI state is based on the selected unified TCI codepoint including one downlink applicable TCI state.

In some examples, the UE selects the one default unified TCI state irrespective of whether the UE being enabled for two default TCI states.

In some examples, selecting the one default unified TCI state is based on the UE being enabled for one default TCI states.

In some examples, the UE selects the one default unified TCI state irrespective of whether the selected unified TCI codepoint includes at least two downlink applicable TCI state.

In some examples, the UE selects the one default unified TCI state based on the one being a first downlink applicable TCI state of the selected unified TCI codepoint.

In some examples, the UE selects the one default unified TCI state based on the DCI message being a sDCI message or a mDCI message.

In some examples, the UE selects the one default unified TCI state based on at least one control resource set being associated with a control resource set pool index.

In some examples, the UE selects the one default unified TCI state based on the UE being enabled for a default TCI state per control resource set pool index.

In some examples, the DCI message is associated with the control resource set pool index.

In some examples, to support selecting the one or more default unified TCI states, the default selection component 835 may be configured as or otherwise support a means for selecting the one or more default unified TCI states from a unified TCI codepoint other than the selected unified TCI codepoint in accordance with a default rule.

In some examples, selecting in accordance with the default rule is based on the UE being enabled for two default TCI states and the selected unified TCI codepoint including one downlink applicable TCI state.

In some examples, to support selecting the one or more default unified TCI states, the default selection component 835 may be configured as or otherwise support a means for selecting two default unified TCI states from the unified TCI codepoint based on the unified TCI codepoint being a lowest codepoint in a set of activated codepoints that includes at least two downlink applicable TCI states.

In some examples, to support selecting the one or more default unified TCI states, the default selection component 835 may be configured as or otherwise support a means for selecting a downlink applicable TCI state for a lowest control resource set identifier in a latest monitored slot as the one or more default unified TCI states in accordance with a default rule.

In some examples, selecting in accordance with the default rule is based on the DCI message being a mDCI message, and based on at least one control resource set being associated with a control resource set pool index.

In some examples, selecting in accordance with the default rule is based on the UE not being enabled for a default TCI state per control resource set pool index.

In some examples, the TCI activation component 850 may be configured as or otherwise support a means for receiving, prior to the message, a signal indicating a set of one or more activated TCI codepoints.

In some examples, each TCI codepoint of the set of one or more activated TCI codepoints includes one or more joint TCI states, one or more downlink TCI states, one or more uplink TCI states, a joint TCI state and a downlink TCI state being downlink applicable TCI states.

In some examples, the set of one or more activated TCI codepoints includes the selected unified TCI codepoint.

In some examples, the signal is included in a MAC-CE message.

In some examples, the selected unified TCI codepoint is associated with dedicated downlink control channel messages, dedicated downlink shared channel messages, or both.

In some examples, the message is a second DCI message received prior to the DCI message.

In some examples, the one or more downlink messages include an AP-CSI reference signal, a downlink shared channel message, or both.

Figure 9:
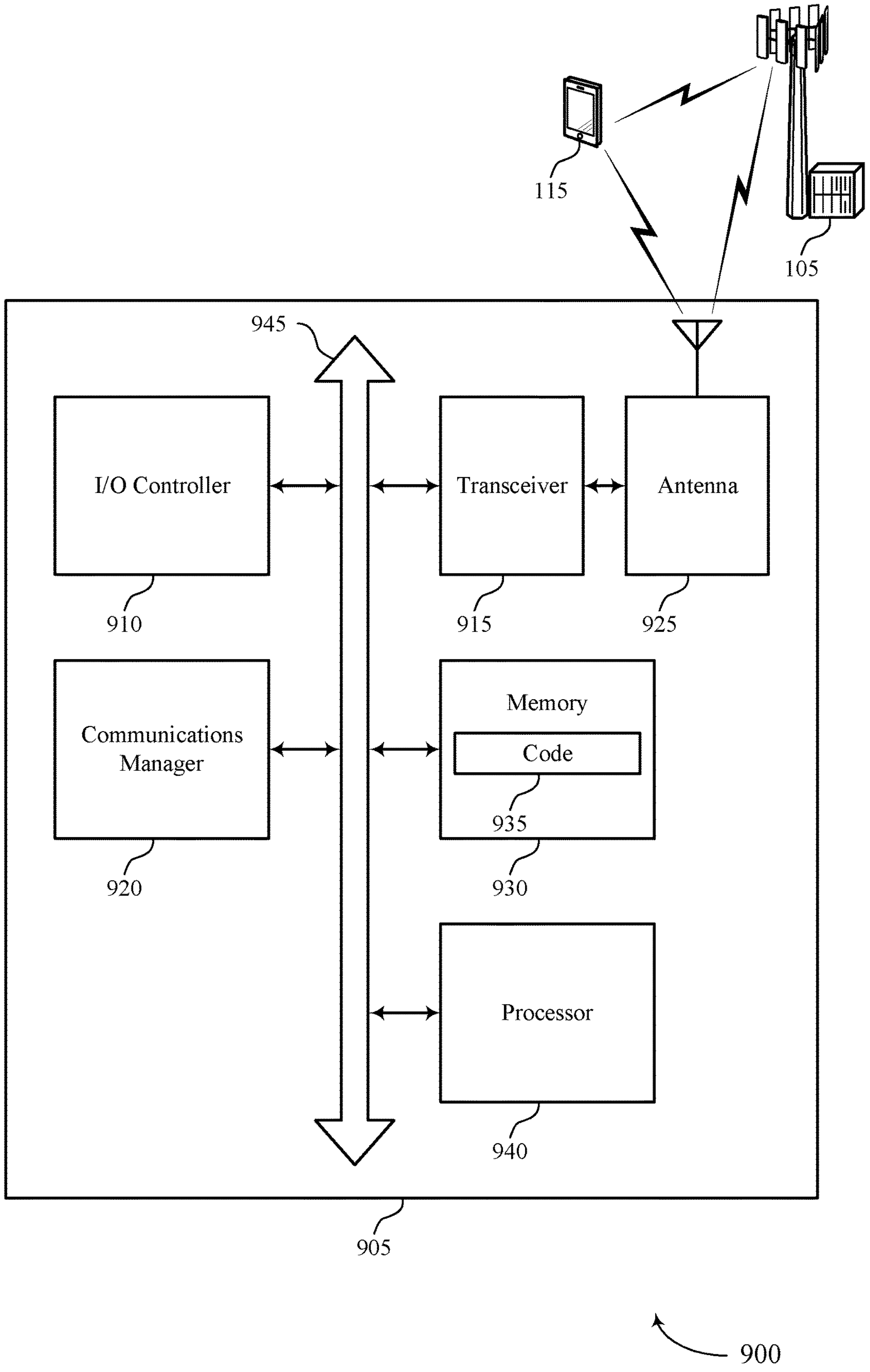
FIG. 9 shows a diagram of a system including a device that supports determining default unified TCI states in accordance with one or more aspects of the present disclosure.

FIG. 9 shows a diagram of a system 900 including a device 905 that supports determining default unified TCI states in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting determining default unified TCI states). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving a DCI message scheduling one or more downlink messages for reception during mTRP operation of a network entity, the DCI message including an indication of one or more TCI states for reception of the one or more downlink messages. The communications manager 920 may be configured as or otherwise support a means for identifying that the one or more downlink messages are scheduled for reception prior to an end of an offset window associated with processing the indication of the one or more TCI states, where a start of the offset window is based at least part on the DCI message. The communications manager 920 may be configured as or otherwise support a means for selecting one or more default unified TCI states based on the DCI message and the mTRP operation. The communications manager 920 may be configured as or otherwise support a means for receiving the one or more downlink messages while operating in the one or more default unified TCI states based on an arrival of the one or more downlink messages occurring prior to the end of the offset window:

By including or configuring the communications manager 920 in accordance with examples as described herein, the device 905 may support techniques for flexibility for TCI operations, more efficient utilization of communication resources, and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of determining default unified TCI states as described herein, or the processor 940 and the memory 930 may be otherwise configured to perform or support such operations.

Figure 10:
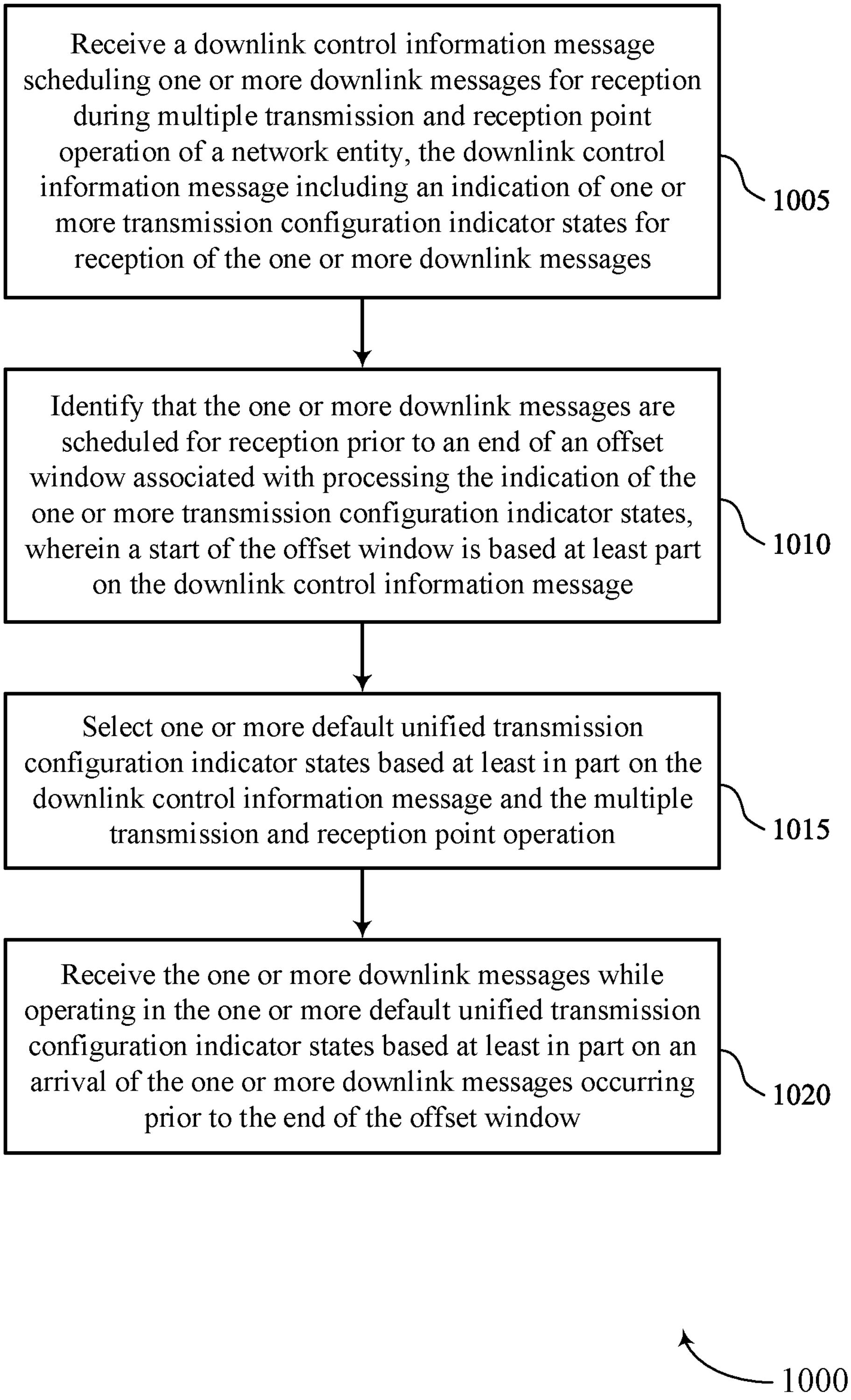
FIGS. 10 through 12 show flowcharts illustrating methods that support determining default unified TCI states in accordance with one or more aspects of the present disclosure.

FIG. 10 shows a flowchart illustrating a method 1000 that supports determining default unified TCI states in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include receiving a DCI message scheduling one or more downlink messages for reception during mTRP operation of a network entity, the DCI message including an indication of one or more TCI states for reception of the one or more downlink messages. The operations of 1005 may be performed in accordance with examples as disclosed herein. In some examples, aspects of the operations of 1005 may be performed by a TCI state component 825 as described with reference to FIG. 8.

At 1010, the method may include identifying that the one or more downlink messages are scheduled for reception prior to an end of an offset window associated with processing the indication of the one or more TCI states, where a start of the offset window is based at least part on the DCI message. The operations of 1010 may be performed in accordance with examples as disclosed herein. In some examples, aspects of the operations of 1010 may be performed by an offset window component 830 as described with reference to FIG. 8.

At 1015, the method may include selecting one or more default unified TCI states based on the DCI message and the mTRP operation. The operations of 1015 may be performed in accordance with examples as disclosed herein. In some examples, aspects of the operations of 1015 may be performed by a default selection component 835 as described with reference to FIG. 8.

At 1020, the method may include receiving the one or more downlink messages while operating in the one or more default unified TCI states based on an arrival of the one or more downlink messages occurring prior to the end of the offset window. The operations of 1020 may be performed in accordance with examples as disclosed herein. In some examples, aspects of the operations of 1020 may be performed by a downlink message component 840 as described with reference to FIG. 8.

Figure 11:
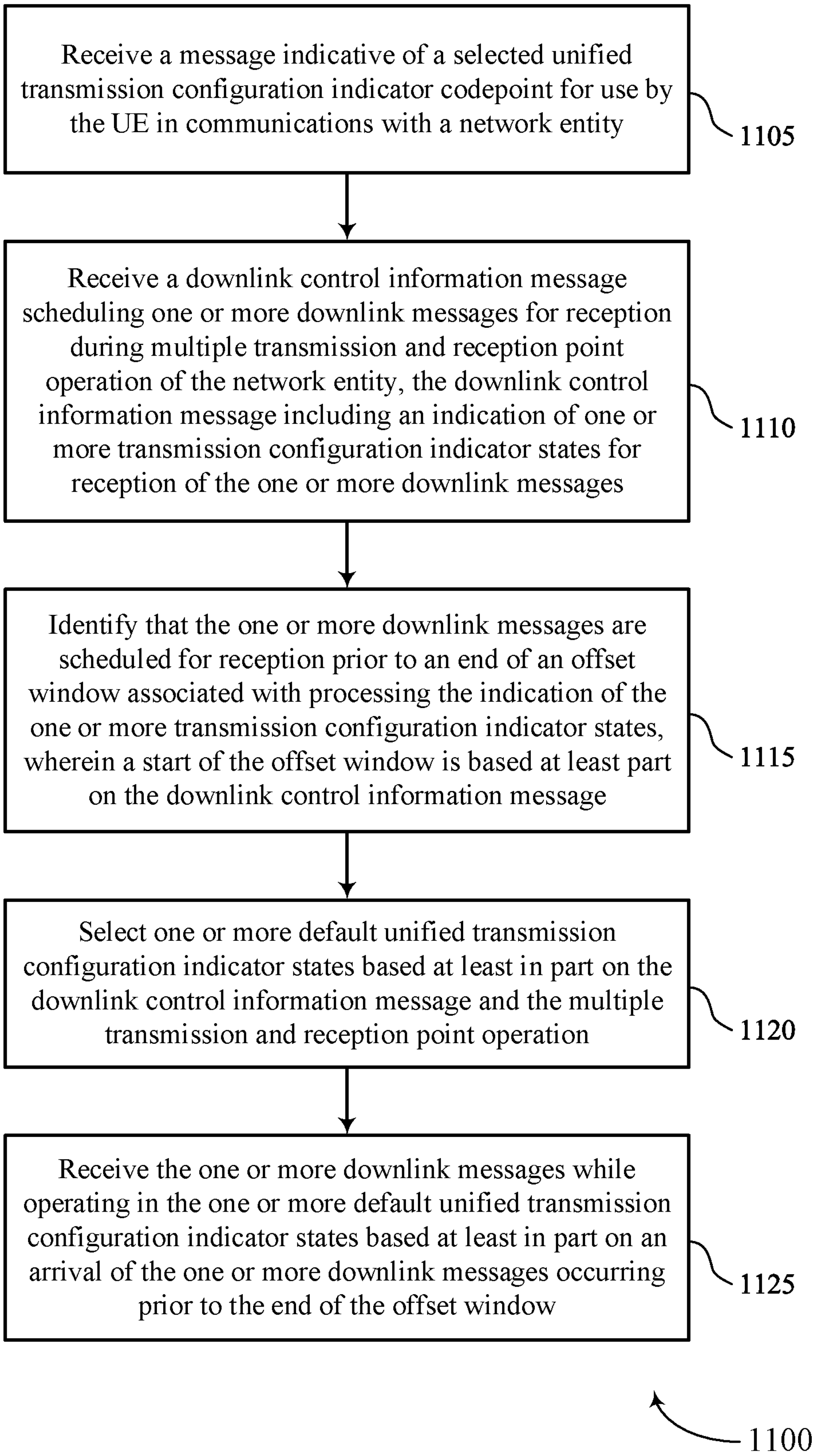

FIG. 11 shows a flowchart illustrating a method 1100 that supports determining default unified TCI states in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving a message indicative of a selected unified TCI codepoint for use by the UE in communications with a network entity. The operations of 1105 may be performed in accordance with examples as disclosed herein. In some examples, aspects of the operations of 1105 may be performed by a TCI codepoint component 845 as described with reference to FIG. 8.

At 1110, the method may include receiving a DCI message scheduling one or more downlink messages for reception during mTRP operation of the network entity, the DCI message including an indication of one or more TCI states for reception of the one or more downlink messages. The operations of 1110 may be performed in accordance with examples as disclosed herein. In some examples, aspects of the operations of 1110 may be performed by a TCI state component 825 as described with reference to FIG. 8.

At 1115, the method may include identifying that the one or more downlink messages are scheduled for reception prior to an end of an offset window associated with processing the indication of the one or more TCI states, where a start of the offset window is based at least part on the DCI message. The operations of 1115 may be performed in accordance with examples as disclosed herein. In some examples, aspects of the operations of 1115 may be performed by an offset window component 830 as described with reference to FIG. 8.

At 1120, the method may include selecting one or more default unified TCI states based on the DCI message and the mTRP operation. The operations of 1120 may be performed in accordance with examples as disclosed herein. In some examples, aspects of the operations of 1120 may be performed by a default selection component 835 as described with reference to FIG. 8.

At 1125, the method may include receiving the one or more downlink messages while operating in the one or more default unified TCI states based on an arrival of the one or more downlink messages occurring prior to the end of the offset window. The operations of 1125 may be performed in accordance with examples as disclosed herein. In some examples, aspects of the operations of 1125 may be performed by a downlink message component 840 as described with reference to FIG. 8.

Figure 12:
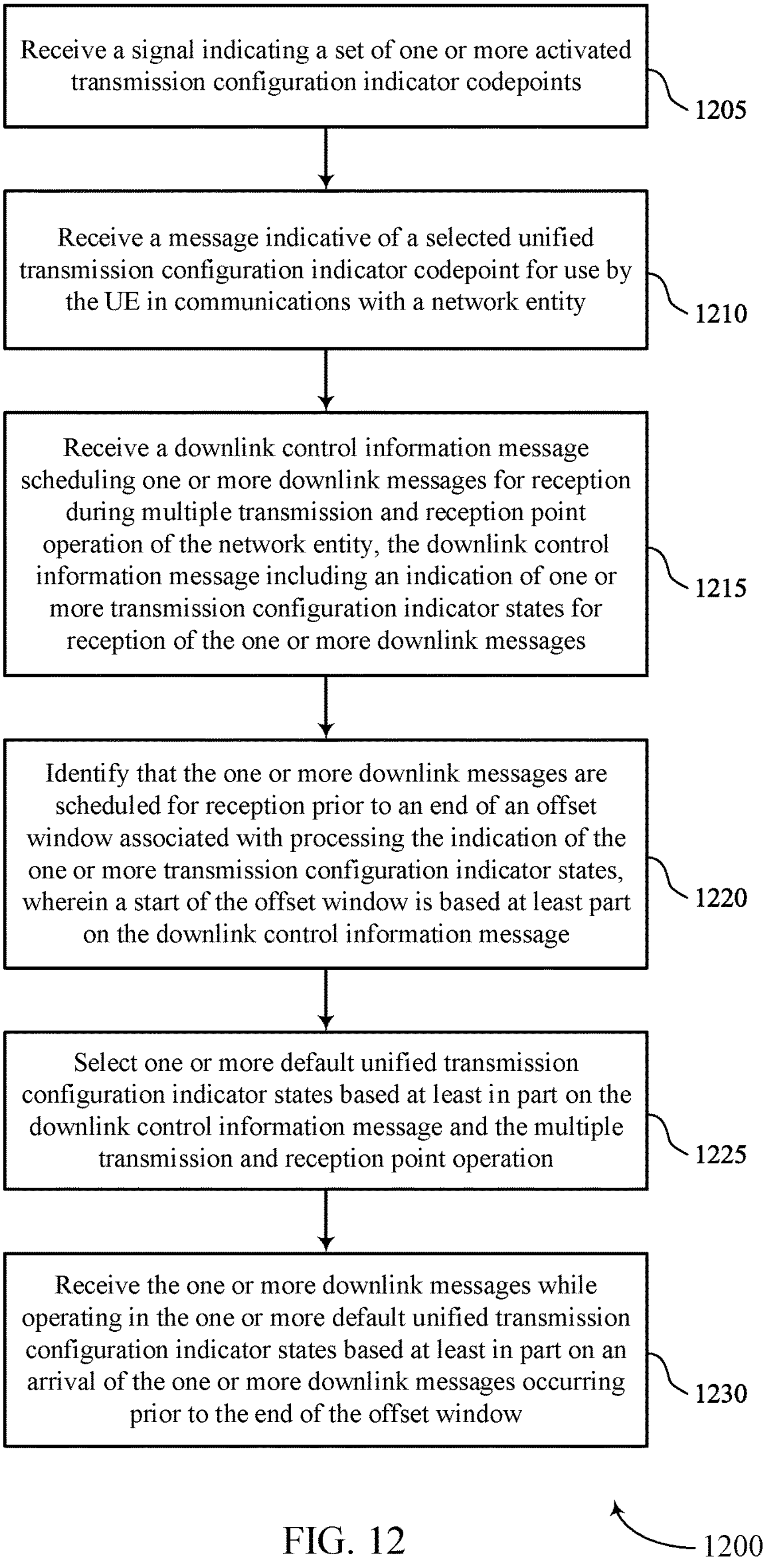

FIG. 12 shows a flowchart illustrating a method 1200 that supports determining default unified TCI states in accordance with one or more aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include receiving a signal indicating a set of one or more activated TCI codepoints. The operations of 1205 may be performed in accordance with examples as disclosed herein. In some examples, aspects of the operations of 1205 may be performed by a TCI activation component 850 as described with reference to FIG. 8.

At 1210, the method may include receiving a message indicative of a selected unified TCI codepoint for use by the UE in communications with a network entity. The operations of 1210 may be performed in accordance with examples as disclosed herein. In some examples, aspects of the operations of 1210 may be performed by a TCI codepoint component 845 as described with reference to FIG. 8.

At 1215, the method may include receiving a DCI message scheduling one or more downlink messages for reception during mTRP operation of the network entity, the DCI message including an indication of one or more TCI states for reception of the one or more downlink messages. The operations of 1215 may be performed in accordance with examples as disclosed herein. In some examples, aspects of the operations of 1215 may be performed by a TCI state component 825 as described with reference to FIG. 8.

At 1220, the method may include identifying that the one or more downlink messages are scheduled for reception prior to an end of an offset window associated with processing the indication of the one or more TCI states, where a start of the offset window is based at least part on the DCI message. The operations of 1220 may be performed in accordance with examples as disclosed herein. In some examples, aspects of the operations of 1220 may be performed by an offset window component 830 as described with reference to FIG. 8.

At 1225, the method may include selecting one or more default unified TCI states based on the DCI message and the mTRP operation. The operations of 1225 may be performed in accordance with examples as disclosed herein. In some examples, aspects of the operations of 1225 may be performed by a default selection component 835 as described with reference to FIG. 8.

At 1230, the method may include receiving the one or more downlink messages while operating in the one or more default unified TCI states based on an arrival of the one or more downlink messages occurring prior to the end of the offset window. The operations of 1230 may be performed in accordance with examples as disclosed herein. In some examples, aspects of the operations of 1230 may be performed by a downlink message component 840 as described with reference to FIG. 8.

The following provides an overview of aspects of the present disclosure:

Aspect 1: A method for wireless communications at a UE, comprising: receiving a DCI message scheduling one or more downlink messages for reception during mTRP operation of a network entity, the DCI message including an indication of one or more TCI states for reception of the one or more downlink messages: identifying that the one or more downlink messages are scheduled for reception prior to an end of an offset window associated with processing the indication of the one or more TCI states, wherein a start of the offset window is based at least part on the DCI message; selecting one or more default unified TCI states based at least in part on the DCI message and the mTRP operation; and receiving the one or more downlink messages while operating in the one or more default unified TCI states based at least in part on an arrival of the one or more downlink messages occurring prior to the end of the offset window.

Aspect 2: The method of aspect 1, further comprising: receiving, prior to the DCI message, a message indicative of a selected unified TCI codepoint for use by the UE in communications with the network entity.

Aspect 3: The method of aspect 2, wherein selecting the one or more default unified TCI states further comprises: selecting two default unified TCI states from the selected unified TCI codepoint.

Aspect 4: The method of aspect 3, wherein selecting from the selected unified TCI codepoint is based at least in part on the selected unified TCI codepoint comprising at least two downlink applicable TCI states.

Aspect 5: The method of any of aspects 3 through 4, wherein selecting the two default unified TCI states is based at least in part on the UE being enabled for two default TCI states.

Aspect 6: The method of any of aspects 3 through 5, wherein selecting the two default unified TCI states is based at least in part on the DCI message being a single DCI message.

Aspect 7: The method of any of aspects 2 through 6, wherein selecting the one or more default unified TCI states further comprises: selecting one default unified TCI state from the selected unified TCI codepoint.

Aspect 8: The method of aspect 7, wherein selecting the one default unified TCI state is based at least in part on the selected unified TCI codepoint comprising one downlink applicable TCI state.

Aspect 9: The method of any of aspects 7 through 8, wherein the UE selects the one default unified TCI state irrespective of whether the UE being enabled for two default TCI states.

Aspect 10: The method of any of aspects 7 through 9, wherein selecting the one default unified TCI state is based at least in part on the UE being enabled for one default TCI states.

Aspect 11: The method of any of aspects 7 through 10, wherein the UE selects the one default unified TCI state irrespective of whether the selected unified TCI codepoint comprises at least two downlink applicable TCI state.

Aspect 12: The method of any of aspects 7 through 11, wherein the UE selects the one default unified TCI state based at least in part on the one being a first downlink applicable TCI state of the selected unified TCI codepoint.

Aspect 13: The method of any of aspects 7 through 12, wherein the UE selects the one default unified TCI state based at least in part on the DCI message being a single DCI message or a multiple DCI message.

Aspect 14: The method of any of aspects 7 through 13, wherein the UE selects the one default unified TCI state based at least in part on at least one control resource set being associated with a control resource set pool index.

Aspect 15: The method of aspect 14, wherein the UE selects the one default unified TCI state based at least in part on the UE being enabled for a default TCI state per control resource set pool index.

Aspect 16: The method of any of aspects 14 through 15, wherein the DCI message is associated with the control resource set pool index.

Aspect 17: The method of any of aspects 2 through 16, wherein selecting the one or more default unified TCI states further comprises: selecting the one or more default unified TCI states from a unified TCI codepoint other than the selected unified TCI codepoint in accordance with a default rule.

Aspect 18: The method of aspect 17, wherein selecting in accordance with the default rule is based at least in part on the UE being enabled for two default TCI states and the selected unified TCI codepoint comprising one downlink applicable TCI state.

Aspect 19: The method of any of aspects 17 through 18, wherein selecting the one or more default unified TCI states further comprises: selecting two default unified TCI states from the unified TCI codepoint based at least in part on the unified TCI codepoint being a lowest codepoint in a set of activated codepoints that includes at least two downlink applicable TCI states.

Aspect 20: The method of any of aspects 2 through 19, wherein selecting the one or more default unified TCI states further comprises: selecting a downlink applicable TCI state for a lowest control resource set identifier in a latest monitored slot as the one or more default unified TCI states in accordance with a default rule.

Aspect 21: The method of aspect 20, wherein selecting in accordance with the default rule is based at least in part on the DCI message being a multiple DCI message, and based at least in part on at least one control resource set being associated with a control resource set pool index.

Aspect 22: The method of any of aspects 20 through 21, wherein selecting in accordance with the default rule is based at least in part on the UE not being enabled for a default TCI state per control resource set pool index.

Aspect 23: The method of any of aspects 2 through 22, further comprising: receiving, prior to the message, a signal indicating a set of one or more activated TCI codepoints.

Aspect 24: The method of aspect 23, wherein each TCI codepoint of the set of one or more activated TCI codepoints comprises one or more joint TCI states, one or more downlink TCI states, one or more uplink TCI states, a joint TCI state and a downlink TCI state being downlink applicable TCI states.

Aspect 25: The method of any of aspects 23 through 24, wherein the set of one or more activated TCI codepoints comprises the selected unified TCI codepoint.

Aspect 26: The method of any of aspects 23 through 25, wherein the signal is included in a MAC-CE message.

Aspect 27: The method of any of aspects 2 through 26, wherein the selected unified TCI codepoint is associated with dedicated downlink control channel messages, dedicated downlink shared channel messages, or both.

Aspect 28: The method of any of aspects 2 through 27, wherein the message is a second DCI message received prior to the DCI message.

Aspect 29: The method of any of aspects 1 through 28, wherein the one or more downlink messages comprise an aperiodic channel state information reference signal, a downlink shared channel message, or both.

Aspect 30: An apparatus for wireless communications at a UE, comprising a processor: memory coupled with the processor; and instructions stored in the memory and executable by the processor to cause the apparatus to perform a method of any of aspects 1 through 29.

Aspect 31: An apparatus for wireless communications at a UE, comprising at least one means for performing a method of any of aspects 1 through 29.

Aspect 32: A non-transitory computer-readable medium storing code for wireless communications at a UE, the code comprising instructions executable by a processor to perform a method of any of aspects 1 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Additionally, "set" as used as a group of objects (e.g., a set of TCIs), indicates a group of one or more objects, such as one or more TCIs.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving a message indicative of a selected unified transmission configuration indicator codepoint for use by the UE in communications with a network entity;

receiving, subsequent to the message indicative of the selected unified transmission configuration indicator codepoint, a downlink control information message scheduling one or more downlink messages for reception during multiple transmission and reception point operation of the network entity, the downlink control information message including an indication of one or more transmission configuration indicator states for reception of the one or more downlink messages;

identifying that the one or more downlink messages are scheduled for reception prior to an end of an offset window associated with processing the indication of the one or more transmission configuration indicator states, wherein a start of the offset window is based at least in part on the downlink control information message;

selecting one or more default unified transmission configuration indicator states from the selected unified transmission configuration indicator codepoint indicated in the message based at least in part on the downlink control information message and the multiple transmission and reception point operation; and receiving the one or more downlink messages while operating in the one or more default unified transmission configuration indicator states based at least in part on an arrival of the one or more downlink messages occurring prior to the end of the offset window.

2. The method of claim 1, wherein selecting the one or more default unified transmission configuration indicator states further comprises:

selecting two default unified transmission configuration indicator states from the selected unified transmission configuration indicator codepoint.

3. The method of claim 2, wherein selecting from the selected unified transmission configuration indicator codepoint is based at least in part on the selected unified transmission configuration indicator codepoint comprising at least two downlink applicable transmission configuration indicator states.

4. The method of claim 2, wherein selecting the two default unified transmission configuration indicator states is based at least in part on the UE being enabled for two default transmission configuration indicator states.

5. The method of claim 2, wherein selecting the two default unified transmission configuration indicator states is based at least in part on the downlink control information message being a single downlink control information message.

6. The method of claim 1, wherein selecting the one or more default unified transmission configuration indicator states further comprises:

selecting one default unified transmission configuration indicator state from the selected unified transmission configuration indicator codepoint.

7. The method of claim 6, wherein selecting the one default unified transmission configuration indicator state is based at least in part on the selected unified transmission configuration indicator codepoint comprising one downlink applicable transmission configuration indicator state.

8. The method of claim 6, wherein the UE selects the one default unified transmission configuration indicator state irrespective of whether the UE is enabled for two default transmission configuration indicator states.

9. The method of claim 6, wherein selecting the one default unified transmission configuration indicator state is based at least in part on the UE being enabled for one default transmission configuration indicator state.

10. The method of claim 6, wherein the UE selects the one default unified transmission configuration indicator state irrespective of whether the selected unified transmission configuration indicator codepoint comprises at least two downlink applicable transmission configuration indicator states.

11. The method of claim 6, wherein the UE selects the one default unified transmission configuration indicator state based at least in part on the one default unified transmission configuration indicator state being a first downlink applicable transmission configuration indicator state of the selected unified transmission configuration indicator codepoint.

12. The method of claim 6, wherein the UE selects the one default unified transmission configuration indicator state based at least in part on the downlink control information message being a single downlink control information message or a multiple downlink control information message.

13. The method of claim 6, wherein the UE selects the one default unified transmission configuration indicator state based at least in part on at least one control resource set being associated with a control resource set pool index.

14. The method of claim 13, wherein the UE selects the one default unified transmission configuration indicator state based at least in part on the UE being enabled for a default transmission configuration indicator state per control resource set pool index.

15. An apparatus for wireless communications at a user equipment (UE), comprising:

a processor;

memory in electronic communication with the processor; and instructions stored in the memory, wherein the instructions are executable by the processor to cause the apparatus to:

receive a message indicative of a selected unified transmission configuration indicator codepoint for use by the UE in communications with a network entity;

receive, subsequent to the message indicative of the selected unified transmission configuration indicator codepoint, a downlink control information message scheduling one or more downlink messages for reception during multiple transmission and reception point operation of the network entity, the downlink control information message including an indication of one or more transmission configuration indicator states for reception of the one or more downlink messages;

identify that the one or more downlink messages are scheduled for reception prior to an end of an offset window associated with processing the indication of the one or more transmission configuration indicator states, wherein a start of the offset window is based at least in part on the downlink control information message;

select one or more default unified transmission configuration indicator states from the selected unified transmission configuration indicator codepoint indicated in the message based at least in part on the downlink control information message and the multiple transmission and reception point operation; and receive the one or more downlink messages while operating in the one or more default unified transmission configuration indicator states based at least in part on an arrival of the one or more downlink messages occurring prior to the end of the offset window.

16. The apparatus of claim 15, wherein the instructions executable by the processor to select the one or more default unified transmission configuration indicator states comprise instructions executable by the processor to:

select two default unified transmission configuration indicator states from the selected unified transmission configuration indicator codepoint.

17. The apparatus of claim 16, wherein selecting from the selected unified transmission configuration indicator codepoint is based at least in part on the selected unified transmission configuration indicator codepoint comprising at least two downlink applicable transmission configuration indicator states.

18. The apparatus of claim 16, wherein selecting the two default unified transmission configuration indicator states is based at least in part on the UE being enabled for two default transmission configuration indicator states.

19. The apparatus of claim 16, wherein selecting the two default unified transmission configuration indicator states is based at least in part on the downlink control information message being a single downlink control information message.

20. The apparatus of claim 15, wherein the instructions executable by the processor to select the one or more default unified transmission configuration indicator states comprise instructions executable by the processor to:

select one default unified transmission configuration indicator state from the selected unified transmission configuration indicator codepoint.

21. The apparatus of claim 20, wherein selecting the one default unified transmission configuration indicator state is based at least in part on the selected unified transmission configuration indicator codepoint comprising one downlink applicable transmission configuration indicator state.

22. The apparatus of claim 20, wherein the UE selects the one default unified transmission configuration indicator state irrespective of whether the UE is enabled for two default transmission configuration indicator states.

23. The apparatus of claim 20, wherein selecting the one default unified transmission configuration indicator state is based at least in part on the UE being enabled for one default transmission configuration indicator state.

24. The apparatus of claim 20, wherein the UE selects the one default unified transmission configuration indicator state irrespective of whether the selected unified transmission configuration indicator codepoint comprises at least two downlink applicable transmission configuration indicator states.

25. The apparatus of claim 20, wherein the UE selects the one default unified transmission configuration indicator state based at least in part on the one default unified transmission configuration indicator state being a first downlink applicable transmission configuration indicator state of the selected unified transmission configuration indicator codepoint.

26. The apparatus of claim 20, wherein the UE selects the one default unified transmission configuration indicator state based at least in part on the downlink control information message being a single downlink control information message or a multiple downlink control information message.

27. The apparatus of claim 20, wherein the UE selects the one default unified transmission configuration indicator state based at least in part on at least one control resource set being associated with a control resource set pool index.

28. The apparatus of claim 27, wherein the UE selects the one default unified transmission configuration indicator state based at least in part on the UE being enabled for a default transmission configuration indicator state per control resource set pool index.

* * * * *